United States Patent
Abe et al.

(10) Patent No.: US 7,260,488 B2
(45) Date of Patent: Aug. 21, 2007

(54) SIMILARITY CALCULATION METHOD AND DEVICE

(75) Inventors: Mototsugu Abe, Tokyo (JP); Masayuki Nishiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 203 days.

(21) Appl. No.: 10/489,012

(22) PCT Filed: Jun. 26, 2003

(86) PCT No.: PCT/JP03/08142

§ 371 (c)(1),
(2), (4) Date: Sep. 17, 2004

(87) PCT Pub. No.: WO2004/006185

PCT Pub. Date: Jan. 15, 2004

(65) Prior Publication Data

US 2005/0033523 A1 Feb. 10, 2005

(30) Foreign Application Priority Data

Jul. 9, 2002 (JP) ............................... 2002-200481

(51) Int. Cl.
*G06F 19/00* (2006.01)
(52) U.S. Cl. ........................................ 702/66; 382/219
(58) Field of Classification Search ............ 702/66–67, 702/75, 151, 158, 190, 191, 193; 382/209, 382/215, 218–219, 280; 324/76.19, 76.21
See application file for complete search history.

(56) References Cited

U.S. PATENT DOCUMENTS 5,937,101 A * 8/1999 Jeon et al. .................. 382/268
5,949,908 A * 9/1999 Sugahara .................... 382/232
6,167,157 A * 12/2000 Sugahara .................... 382/236
6,535,617 B1 * 3/2003 Hannigan et al. ........... 382/100
6,807,305 B2 * 10/2004 Rajagopal et al. .......... 382/209
6,963,667 B2 * 11/2005 Rajagopal et al. .......... 382/218
6,968,090 B2 * 11/2005 Yokose ....................... 382/251

FOREIGN PATENT DOCUMENTS

| EP | 0 575 815 | 12/1993 |
|----|-----------|---------|
| JP | 62-27878 | 2/1987 |
| JP | 02-273880 | 11/1990 |
| JP | 07-287753 | 10/1993 |
| JP | 10-13832 | 1/1998 |
| JP | 2002-8072 | 1/2002 |
| WO | WO99/67696 | 12/1999 |

* cited by examiner

*Primary Examiner*—Carol S. W. Tsai
*Assistant Examiner*—Mary Catherine Baran
(74) *Attorney, Agent, or Firm*—Sonnenschein Nath & Rosenthal LLP

(57) ABSTRACT

In a similarity vector detecting apparatus (2), vector transform units (20), (21) implement transform by sequential matrix, Discrete Cosine Transform, Discrete Fourier Transform, Walsh-Hadamard Transform, or Karhunen-Lueve Transform to registered vector g and input vector f. A hierarchical distance calculating unit (23) performs, in a hierarchical manner, distance calculation between two vectors in order from vector component having high significance, i.e., component having large dispersion or eigen value in the above-described transform operations, or from low frequency component. Further, in the case where it is judged at a threshold value judgment unit (24) that integrated value of distances calculated up to a certain hierarchy is above threshold value S of distance, only output indicating that the integrated value is above the threshold value S is provided to truncate distance calculation.

26 Claims, 22 Drawing Sheets

SIMILARITY CALCULATION METHOD AND DEVICE

TECHNICAL FIELD

The present invention relates to a similarity calculation method, a similarity calculation apparatus, a program and a recording medium which perform pattern matching between two vectors at a high speed.

This Application claims priority of Japanese Patent application No. 2002-200481, field on Jul. 9, 2002, the entirety of which is incorporated by reference herein.

BACKGROUND ART

Hitherto, in order to detect a pattern which is substantially the same as an already known pattern from an unknown input signal, or to evaluate similarity between two signals, judgment of similarity or coincidence of data is conducted in all technical fields to which signal processing is related, such as acoustic processing technology, image processing technology, communication technology, and/or radar technology, etc. In general, in order to detect analogous data, a known technique features data as vectors to judge similarity by magnitude of the distance or angle (correlation) thereof.

Particularly, the so-called full search in which similarities between input value and all respective candidates are determined thereafter to determine data where the distance is the shortest is a technology which is simple and has no detection leakage, and is frequently used in the case where data quantity is small. However, e.g., in the case where the portion similar to input image or input voice (sound) is retrieved from a large quantity of accumulated images or voices (sounds), since the dimension of the feature vector per second is large and retrieval with respect to those feature vectors which have been accumulated by ten to several hundred hours is conducted, there is the problem that retrieval time becomes vast when such a simple full search is performed.

On the other hand, in order to retrieve a large quantity of data, in such cases that complete simultaneous retrieval of coded data, e.g., document retrieval is conducted, high speed operation technology such as binary tree search or Hash method is used. In accordance with this technology, data are stored in advance in the state where they are put in order, to omit comparison of branch or table different from input data at the time of retrieval to thereby realize high speed operation. However, in the case where physical signal, e.g., image or sound, etc. is taken as subject, since distortion and/or noise essentially exist in data, it is rare that coded data completely coincide with each other. As a result, in the case where high speed operation technology is used, a large number of detection leakages would take place. In addition, since data is essentially multi-dimensional, there is the problem that it is difficult to implement in advance univocal sequencing to data.

In view of the above, there is proposed, in the Japanese Patent Publication Laid Open No. H08-123460, a technology in which a process for grouping plural vectors close in distance to represent the grouped vectors by one representative vector is performed at the time of data registration to first calculate distance between input vector and representative vector at the time of retrieval to conduct comparison with all vectors within group only with respect to vectors of the group close in distance to thereby permit similar (analogous) vector retrieval to be performed at high speed, and to have ability to reflect distortion of vector at multi-dimension.

Further, there is proposed, in the Japanese Patent Publication Laid Open No. 2001-134573, a technology in which vectors are encoded to index them by short code to thereby suppress increase in the number of times of distance calculations to permit high speed similar (analogous) data retrieval.

However, in the technology described in the above-described Japanese Patent Publication Laid Open No. H08-123460, there was the problem that suitable grouping and selection of representative vector are required at the time of registration so that the registration operation becomes troublesome. Moreover, there was also the problem that since it is not limited at the time of retrieval that, e.g., registered vector which is least distant with respect to input vector belongs to group in which representative vector which is least distant with respect to input vector represents, operation for determining group to be retrieved becomes troublesome.

Further, in the technology described in the above-described Japanese Patent Publication Laid Open No. 2001-134573, there was the problem that distance relationship between vectors is lost when encoding is performed, or the results in complicated distance relationship in non-additive or non-monotonous manner so that mechanism of registration and/or retrieval becomes troublesome.

Here, since image and/or sound are essentially time-series, it is desirable that registration is conducted on the real time basis, and it is desirable that time order can be reflected at the time of retrieval. In other words, there are instances where such techniques which require registration operation to exchange time-series, and/or which require redistribution (reshuffle) with respect to data or index of already registered data at the time of registration as in the case of the technology described in the above-described Japanese Patent Publication Laid Open No. H08-123460 and Japanese Patent Publication Laid Open No. 2001-134573 are not suitable for retrieval of time-series data.

That is, there is desired such a mechanism that retrieval is performed in a time extremely shorter than that at full search while satisfying the conditions where (a) structural simplicity and robustness with respect to distortion of full search are not lost,
(b) registration and/or deletion are conducted within real time, and
(c) operation with respect to other already registered data is not required by registration or deletion.

DISCLOSURE OF THE INVENTION

The present invention has been proposed in view of such conventional actual circumstances, and its object is to provide a similarity calculation method and a similarity calculating apparatus which perform pattern matching between two vectors at a high speed while satisfying the above-described conditions, a program for allowing a computer to execute the similarity calculation processing, and a computer readable recording medium where such program is recorded.

To attain the above-described object, a similarity calculation method according to the present invention is directed to a similarity calculation method of determining similarity between two input vectors, and includes a hierarchical distance calculation step of performing distance calculation between the two input vectors in a hierarchical manner, a threshold value comparison step of comparing integrated value of distances calculated at respective hierarchies of the hierarchical distance calculation step with threshold value set in advance, a control step of controlling distance calculation at the hierarchical distance calculation step in accordance with comparison result at the threshold value comparison step, and an output step of outputting, as the similarity, integrated value of distances calculated up to the last hierarchy, wherein, at the control step, in the case where integrated value of distances calculated up to a certain hierarchy is above the threshold value at the threshold value comparison step, control is conducted so that distance calculation is truncated.

In such a similarity calculation method, distance calculation between two vectors is conducted in a hierarchical manner, whereby in the case where integrated value of distances calculated up to a certain hierarchy is above a predetermined threshold value, it is only detected, without calculating actual distance, that the integrated value of distances is above the threshold value to thereby allow operation to be performed at a high speed.

Moreover, this similarity calculation method may further include a transformation step of implementing a predetermined transform operation to the two input vectors. In this case, at the hierarchical distance calculation step, distance calculation between the two input vectors transformed at the transformation step is performed in a predetermined order based on the predetermined transform operation. Here, the predetermined transform operation is, e.g., transformation for performing sequencing of order of respective components constituting input vector in accordance with magnitude of dispersion of the respective components, the Discrete Cosine Transform, Discrete Fourier Transform, Walsh-Hadamard Transform or Karhunen-Lueve Transform.

Further, this similarity calculation method may include a division step of taking out, in the predetermined order, respective components which constitute the two input vectors transformed at the transform step to divide them into hierarchical plural partial vectors. In this case, at the hierarchical distance calculation step, distance calculation between respective components which constitute partial vectors is performed in a hierarchical manner in order from the partial vector of the uppermost hierarchy, whereby in the case where integrated value of calculated distances between all components which constitute partial vectors up to a certain hierarchy is below the threshold value, distance calculation between respective components which constitute the partial vector of one hierarchy lower is performed.

Further, in order to attain the above-described object, a similarity calculating apparatus according to the present invention is directed to a similarity calculating apparatus adapted for determining similarity between two input vectors, and comprises hierarchical distance calculating means for performing distance calculation between the two input vectors in a hierarchical manner, threshold value comparing means for comparing integrated value of distances calculated at respective hierarchies by the hierarchical distance calculating means with threshold value set in advance, control means for controlling distance calculation by the hierarchical distance calculating means in accordance with comparison result by the threshold value comparing means, and output means for outputting, as the similarity, integrated value of distances calculated up to the last hierarchy, wherein the control means or unit conducts a control so as to abort (truncate) distance calculation in the case where integrated value of distances calculated up to a certain hierarchy is above the threshold value as the result of comparison by the threshold value comparing means.

Such similarity calculating apparatus performs distance calculation between two vectors in a hierarchical manner, whereby in the case where integrated value of distances calculated up to a certain hierarchy is above a predetermined threshold value, it is only detected, without calculating actual distance, that the integrated value of distances is equal to or larger than the threshold value to thereby allow operation to be conducted at a high speed.

Further, this similarity calculating apparatus may further comprise transformation means for implementing a predetermined transform operation to the two input vectors. In this case, the hierarchical distance calculating means conducts distance calculation between the two input vectors transformed by the transform means in a predetermined order based on the predetermined transform operation. Here, the predetermined transform operation is, e.g., transform for performing sequencing of order of respective components which constitute input vector in accordance with magnitude of dispersion of the respective components, Discrete Cosine Transform, the Discrete Fourier Transform, Walsh-Hadamard Transform, or Karhunen-Lueve Transform.

Further, this similarity calculating apparatus may comprise dividing means for taking out, in the predetermined order, respective components which constitute the respective two input vectors transformed by the transform means to divide them into hierarchical plural partial vectors. In this case, the hierarchical distance calculating means performs, in a hierarchical manner, distance calculation between respective components which constitute partial vectors in order from the partial vector of the uppermost hierarchy, whereby in the case where integrated value of calculated distances between all components which constitute partial vectors up to a certain hierarchy is below the threshold value, distance calculation between respective components which constitute partial vectors of one hierarchy lower is performed.

In addition, a program according to the present invention serves to allow computer to execute the above-described similarity calculation processing, and recording medium according to the present invention is a computer readable recording medium where such program is recorded.

Still further objects of the present invention and practical merits obtained by the present invention will become more apparent from the description of the embodiments which will be given below.

BEST MODE FOR CARRYING OUT THE INVENTION

Explanation will be given below in detail with reference to the attached drawings in connection with practical embodiments to which the present invention is applied. In this embodiment, the present invention is applied to a similarity vector detection method and an apparatus therefor which detect, at a high speed, vectors similar to input vector from plural registered vectors.

Specifically, in the similarity vector detection method and the apparatus therefor of this embodiment, in calculating distance between two vectors, there is employed an approach to calculate distance when corresponding distance is below a predetermined threshold value, and to only detect, without calculating actual distance, that corresponding distance is larger than threshold value when it is above the predetermined value to thereby allow operation of similarity vector detection to be conducted at a high speed. It is to be noted that, in the similarity vector detecting apparatus in this embodiment, in the case where distance is above threshold value, −1 is assumed to be outputted for convenience.

Hereinafter, two vectors f and g for calculating distance are represented by the following formulas.

$$f = (f[1], f[2], \ldots, f[N])^t \quad (1)$$

$$g = (g[1], g[2], \ldots, g[N])^t \quad (2)$$

Here, in the formula (1), f[1], f[2], . . . represent respective components of vector f. In the formula (2), g[1], g[2], . . . represent respective components of vector g. In addition, t represents transposition and N represents dimension of vector.

(1) First Embodiment

Figure 1:
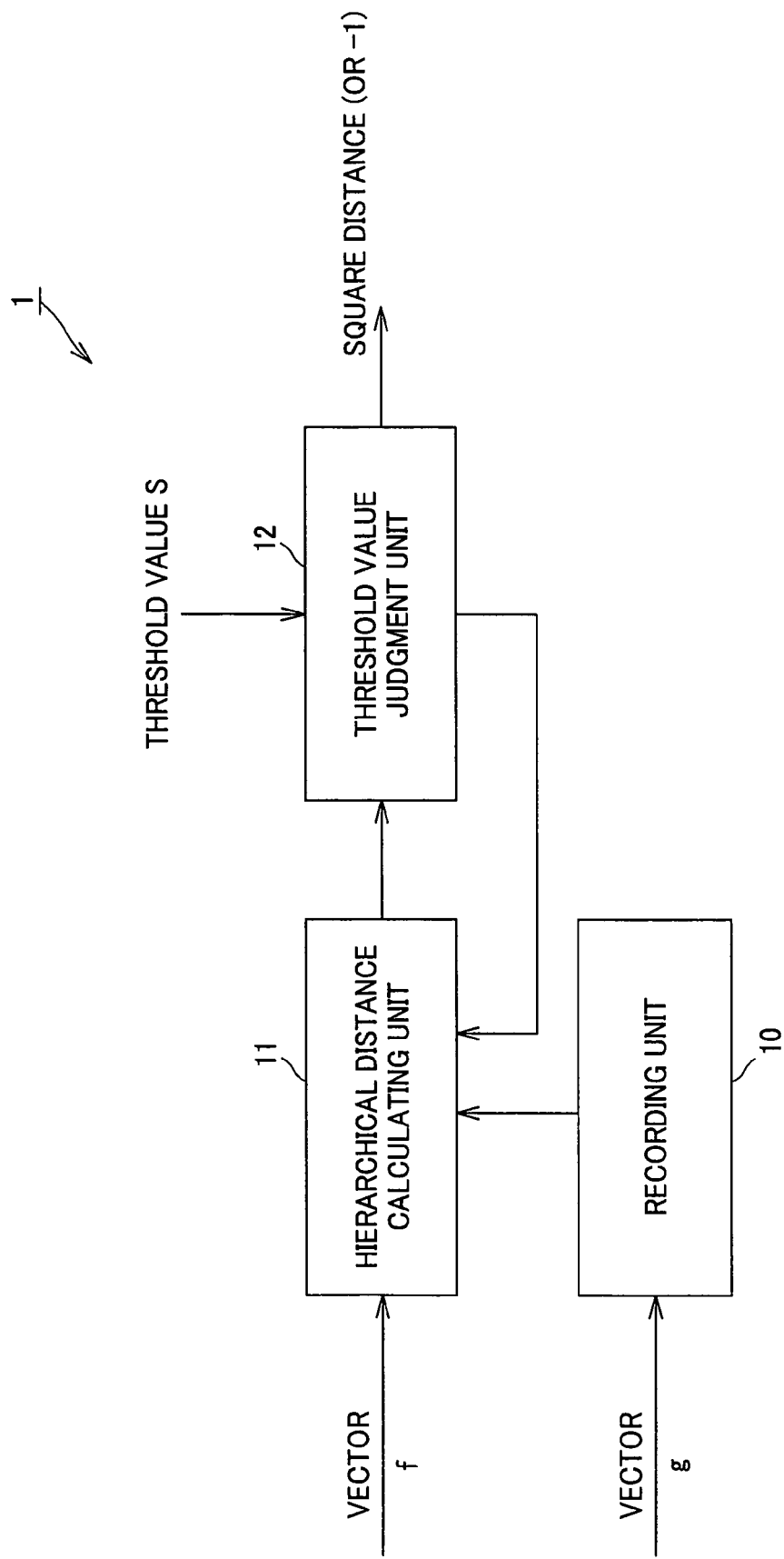
FIG. 1 is a block diagram illustrating an outline of the configuration of a similarity vector detecting apparatus in a first embodiment in accordance with the present invention.

Outline of the configuration of the similarity vector detecting apparatus in the first embodiment is shown in FIG. 1. As shown in FIG. 1, the similarity vector detecting apparatus 1 serves to input vector f and vector g to output square distance between the vectors (or −1), and is composed of a recording unit 10, a hierarchical distance calculating unit 11, and a threshold value judgment unit 12.

Figure 2:
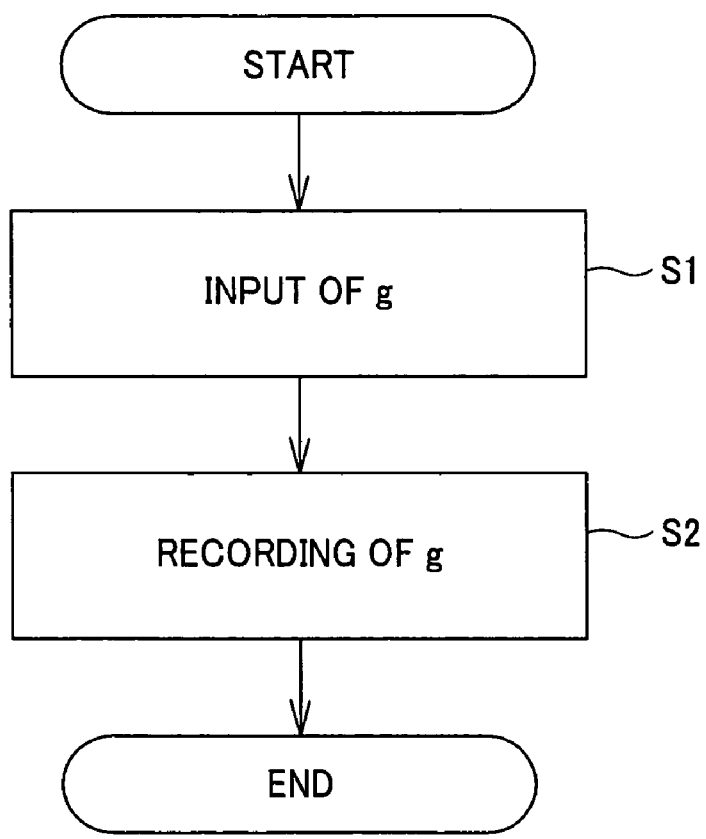
FIG. 2 is a flowchart illustrating the process at the time of vector registration in the similarity vector detecting apparatus.

The processing at the time of registration in this similarity vector detecting apparatus 1 will be explained by using the flowchart of FIG. 2. First, at step S1, the recording unit 10 (FIG. 1) inputs in advance registered vector g. In general, vector g is plural numbers and may become a vast number in many cases. Further, at the subsequent step S2, the recording unit 10 records inputted vector g.

As stated above, in the first embodiment, since it is unnecessary to conduct a special operation at the time of registration, the apparatus is simple and is suitable for processing on a real time basis. In this example, the recording unit 10 is, e.g., magnetic disc, optical disc or semiconductor memory, etc.

Figure 3:
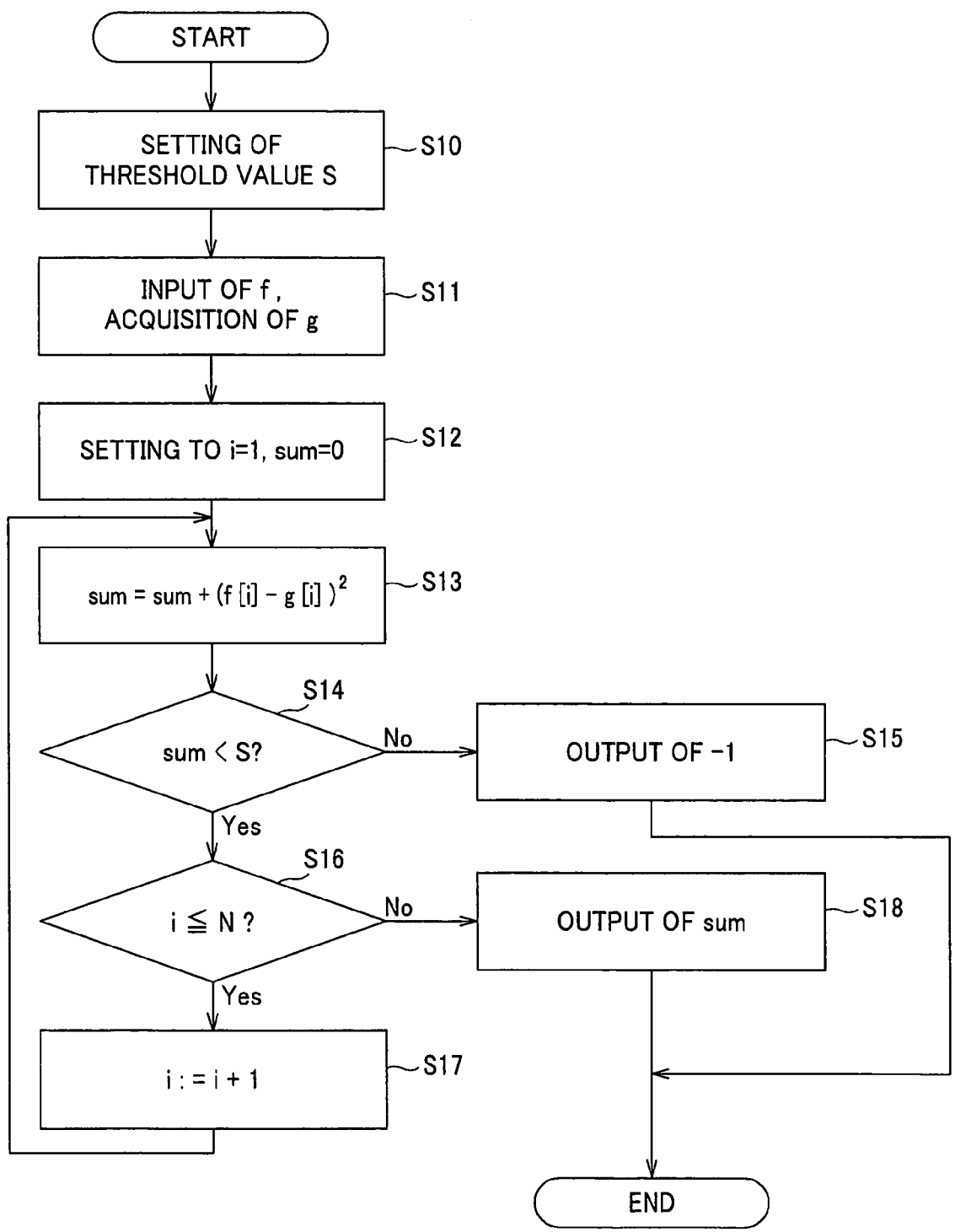
FIG. 3 is a flowchart illustrating the process at the time of vector retrieval in the similarity vector detecting apparatus.

Subsequently, the processing at the time of retrieval in the similarity vector detecting apparatus 1 will be explained by using the flowchart of FIG. 3. First, at step S10, the threshold value judgment unit 12 (FIG. 1) sets threshold value S of distance. At the subsequent step S11, the hierarchical distance calculating unit 11 inputs vector f, and acquires one vector g recorded at the recording unit 10.

Subsequently, at step S12, the hierarchical distance calculating unit 11 sets component number i serving as internal variable to 1, and sets integrated value sum of distance to 0. At step S13, integrating operation as indicated by the following formula (3) is performed between the i-th component f[i] of vector f and the i-th component g[i] of vector g.

$$\text{sum} = \text{sum} + (f[i] - g[i])^2 \quad (3)$$

At step S14, the threshold value judgment unit 12 discriminates whether or not integrated value sum is smaller than threshold value S. In the case where integrated value sum is smaller than threshold value S (Yes), processing proceeds to step S16. In the case where integrated value sum is threshold value S or larger (No), the threshold value judgment unit 12 outputs −1 at step S15 to complete processing. Here, as described above, −1 which is outputted is convenient numerical value indicating that distance between inputted vector f and acquired vector g is above threshold value S, and this vector g is nullified. As stated above, the threshold value judgment unit 12 provides threshold value S and serves to truncate integrating operation at the hierarchical distance calculating unit 11 in the case where integrated value sum is above threshold value S at the middle hierarchy of integrating operation to thereby realize high speed processing.

As step S16, it is discriminated whether or not component number i is the number of dimensions N of vector f or vector g or smaller. In the case where the component number i is N or smaller (Yes), i is incremented at step S17 to return to step S13. On the other hand, in the case where the component number i is larger than N (No), the threshold value judgment unit 12 outputs integrated value sum at step S18 because integrating operation has not been completed until the last component of vector f or vector g is used in the processing. It is to be noted that integrated value sum at this time is square of distance between vectors.

While the processing with respect to one registered vector g has been indicated above in the flowchart of FIG. 3, similar processing is performed with respect to all registered vectors g in practice to output, as vector similar to vector f, all vectors g in which integrated value sum of distances with respect to vector f is below the threshold value S.

Figure 4:
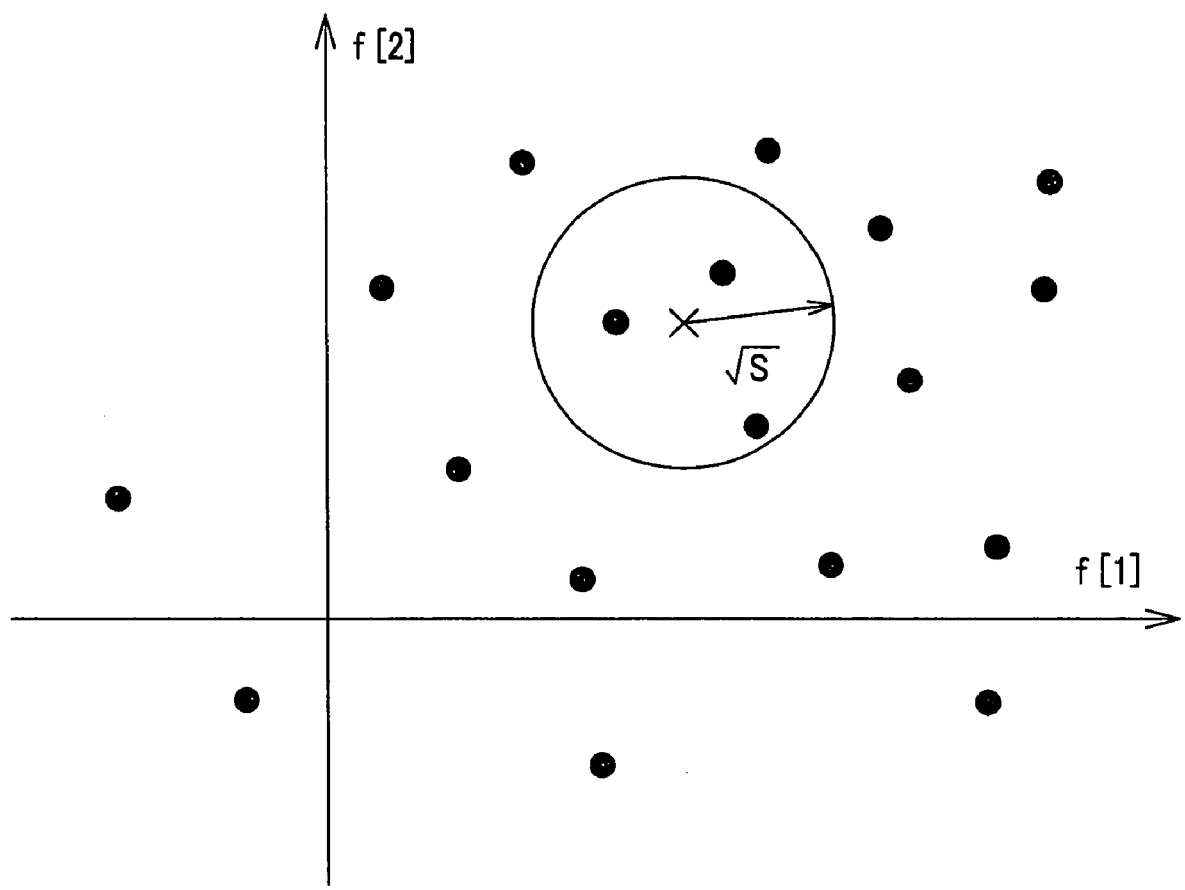
FIG. 4 is a graph illustrating the process in the first embodiment.

When the processing in the first embodiment which has been explained above is explained, this processing corresponds to the processing to calculate precise distance only with respect to registered vectors in which distance from input vector indicated by x in the figure is within the range of super sphere having radius $\sqrt{S}$ in connection with a large number of registered vectors indicated by black circle in FIG. 4, and to nullify registered vectors without the range at the time point when integrated value of distances of every respective axes is above radius.

It is to be noted that while square distance between vectors has been used in the above-described explanation, a similar technique may be used with respect to arbitrary distance scale without being limited to square distance. It should be noted that in the case where square distance is used, there is no possibility that erroneous nullification is caused to take place because integrated value sum monotonously increases with respect to integrated value of distances between respective components. Moreover, since sum total of distances between respective components is in correspondence with distance between vectors, entirely the same distances as simple full search method are outputted in regard to vectors f and g in which distance is threshold value $\sqrt{S}$ or smaller so that there is no possibility that an error may take place.

Further, in the case of this technique, since it is unnecessary to prepare reference table, etc. which may break the time series relationship, updating and/or deletion of data can be conducted in accordance with time series order, so processing and/or management are easy. In addition, it is also easily possible to conduct retrieval in accordance with time series order, or to designate a time series range to be retrieved.

(2) Second Embodiment

Figure 5:
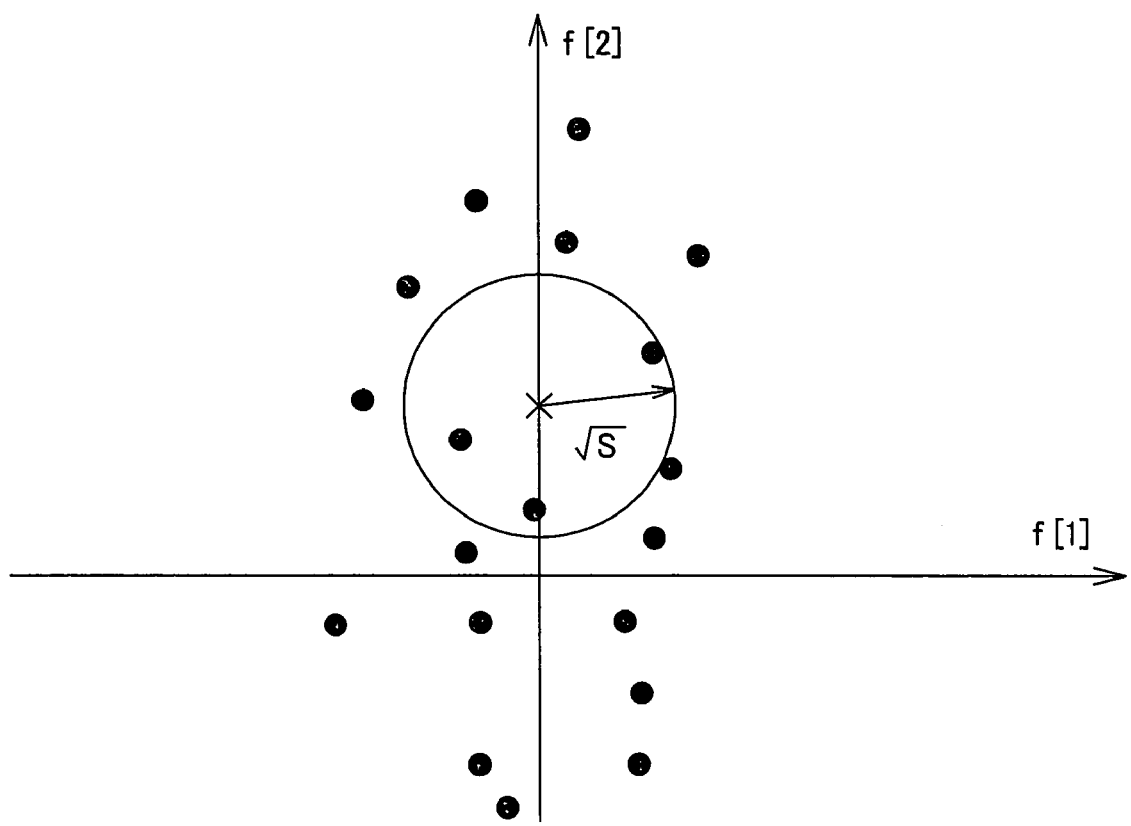
FIG. 5 is a graph illustrating an example in which there exists deviation in distribution of vector within feature space.

In the above-described first embodiment, threshold value S of distance is set, thereby making it possible to conduct retrieval equivalent to fall search at a high speed. However, in the case of this technique, since from which vector component execution of retrieval begins is dependent upon arrangement order of vectors, difference takes place in retrieval speed by this arrangement order. For example, in such cases that deviation exists in distribution of vectors within feature space as shown in FIG. 5, retrieval speed greatly changes in dependency upon which of f[1] axis or f[2] axis is first integrated. In this example, employment of a method of first evaluating f[2] axis results in less extra integration to thereby realize high speed operation.

In view of the above, in the second embodiment which will be explained below, as indicated by the following formulas (4) and (5), multiplication of normal orthogonal transform matrix U is conducted with respect to input vector f and registered vector g to perform orthogonal transform operation to conduct retrieval in order of significance by using the orthogonally transformed vectors f' and g' to thereby allow retrieval to be conducted at higher speed.

$$f'=Uf \quad (4)$$

$$g'=Ug \quad (5)$$

It is to be noted that square distance $d^2$ between two vectors g and f is not changed by normal orthogonal transform matrix U as indicated by the following formula (6).

$$d^2=\|f'-g'\|^2=\|U(f-g)\|^2=(f-g)^t U^t U(f-g)=(f-g)^t(f-g)=\|f-g\|^2 \quad (6)$$

Figure 6:
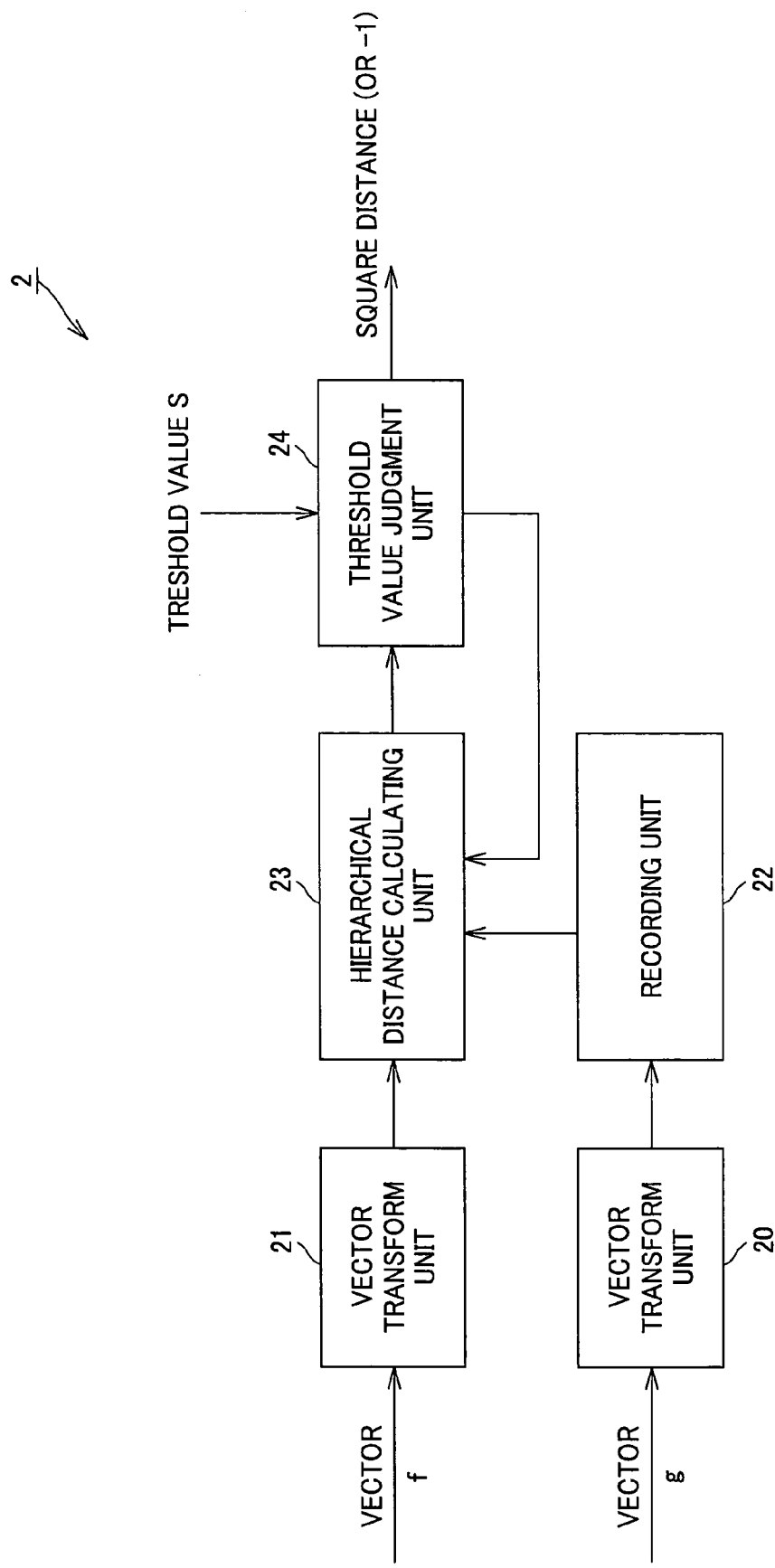
FIG. 6 is a graph illustrating an outline of the configuration of a similarity vector detecting apparatus in the second embodiment.

Outline of the configuration of the similarity vector detecting apparatus in the second embodiment is shown in FIG. 6. As shown in FIG. 6, the similarity vector detecting apparatus 2 serves to input vectors f and g to output distance between the vectors (or −1), and is composed of vector transform units 20, 21, a recording unit 22, a hierarchical distance calculating unit 23, and a threshold value judgment unit 24. Here, the vector transform units 20, 21 serve to respectively implement similar transform operations to vectors g and f. In addition, the recording unit 22 is, e.g., magnetic disc, optical disc or semiconductor memory, etc.

Figure 7:
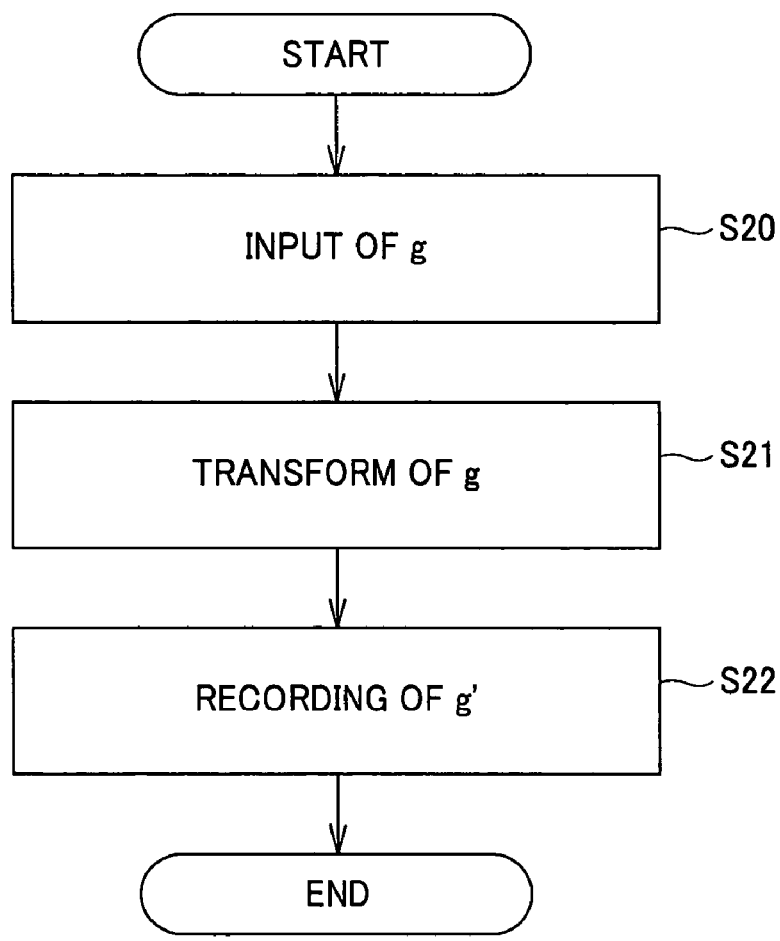
FIG. 7 is a flowchart illustrating the process at the time of vector registration in the similarity vector detecting apparatus.

The processing at the time of registration in this similarity vector detecting apparatus 2 will be explained by using the flowchart of FIG. 7. First, at step S20, the vector transform unit 20 (FIG. 6) inputs registered vector g in advance. At the subsequent step S21, vector g is transformed as indicated by the above-described formula (5) to generate vector g'. Further, at step S22, the recording unit 10 records transformed vector g'.

Figure 8:
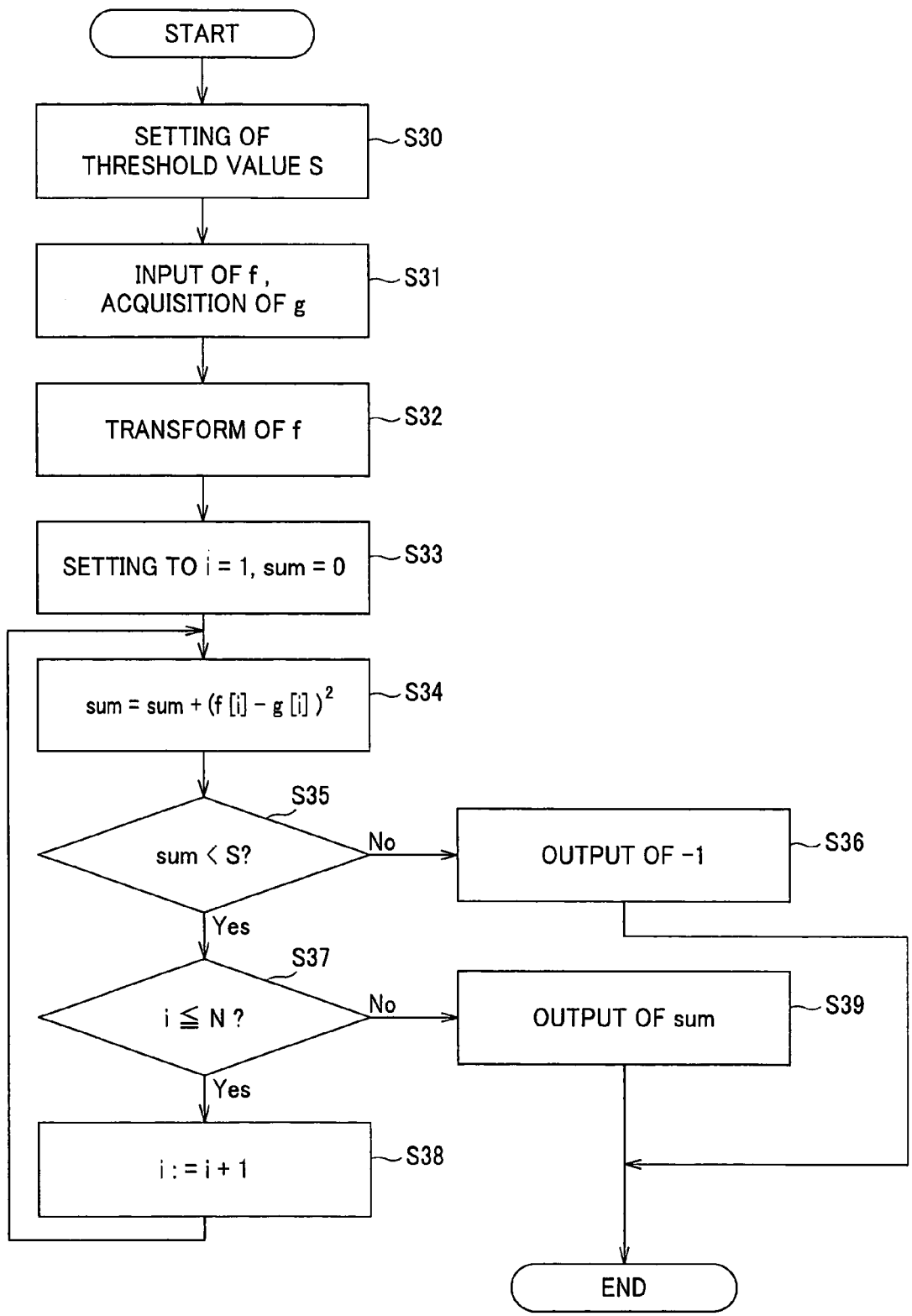
FIG. 8 is a flowchart illustrating processing at the time of vector retrieval in the similarity vector detecting apparatus.

Next, the processing at the time of retrieval in the similarity vector detecting apparatus 2 will be explained by using the flowchart of FIG. 8. First, at step S30, the threshold value judgment unit 24 (FIG. 6) sets threshold value S of distance. At the subsequent step S31, the vector transform unit 21 inputs vector f and the hierarchical distance calculating unit 23 acquires one vector g' recorded at the recording unit 22.

Subsequently, at step S32, the vector transform unit 21 transforms vector f as indicated by the above-described formula (4) to generate vector f'.

At step S33, the hierarchical distance calculating unit 23 sets component number i serving as internal variable to 1, and sets integrated value sum of distance to 0. At step S34, integrating operation as indicated by the following formula (7) is performed between the i-th component f'[i] of vector f' and the i-th component g'[i] of vector g'.

$$\text{sum}=\text{sum}+(f'[i]-g'[i])^2 \quad (7)$$

At step S35, the threshold value judgment unit 24 discriminates whether or not integrated value sum is smaller than threshold value S. In the case where integrated value sum is smaller than threshold value S (Yes), processing proceeds to step S37. In the case where integrated value sum is threshold value S or larger (No), the threshold value judgment unit 24 outputs −1 at step S36 to complete processing.

At step S37, it is discriminated whether or not the component number i is the number of dimensions N or smaller of vector f' and vector g'. In the case where the component number i is N or smaller (Yes), i is incremented at step S38 to return to step S34. On the other hand, in the case where the component number i is larger than N (No), the threshold value judgment unit 24 outputs integrated value sum at step S39 because integrating operation is completed up to the last component of vectors f' and g' to complete processing. It is to be noted that the integrated value sum at this time is the square of distance between vectors.

While the processing with respect to one registered vector g' has been indicated above in the flowchart of FIG. 8, there is employed in practice an approach to perform similar processing with respect to all registered vectors g' to output, as vector similar to vector f', all vectors g' in which integrated value sum of distance with respect to vector f' is below the threshold value S.

Here, while various matrixes may be used as the above-described normal orthogonal transform matrix U, explanation will be given below in four examples in practical sense.

(2-1) Practical Example of Orthogonal Transform (2-1-1)

Sequential matrix is mentioned as the most simple orthogonal transform. In this sequential matrix, the order of vector component is caused to simply undergo sequencing. For example, sequential matrix P of the eighth order is expressed in a form as indicated by the following formula (8).

$$P = \begin{bmatrix} 0 & 1 & 0 & 0 & 0 & 0 & 0 & 0 \\ 1 & 0 & 0 & 0 & 0 & 0 & 0 & 0 \\ 0 & 0 & 0 & 1 & 0 & 0 & 0 & 0 \\ 0 & 0 & 1 & 0 & 0 & 0 & 0 & 0 \\ 0 & 0 & 0 & 0 & 0 & 1 & 0 & 0 \\ 0 & 0 & 0 & 0 & 1 & 0 & 0 & 0 \\ 0 & 0 & 0 & 0 & 0 & 0 & 0 & 1 \\ 0 & 0 & 0 & 0 & 0 & 0 & 1 & 0 \end{bmatrix} \quad (8)$$

In the case where distribution of respective components of vectors is different as in the case of the above-described FIG. 5, it is obvious that the larger dispersion of the component is, the larger the distribution with respect to distance becomes. Accordingly, in determining order of sequencing, it is optimum to prepare in advance sufficient number (I) of sample vectors $g_i$ to set sequential matrix arranged in order of magnitude of dispersion vector V calculated by the following formula (9).

$$V = \sum_{i=1}^{I} (g_i - \bar{g})^2, \quad \bar{g} = \frac{1}{I} \sum_i g_i \quad (9)$$

It is to be noted that the orthogonal transform using this sequential matrix is effective in such cases that ways of spreading of respective vector components are different, and is high in speed since it is sufficient to perform sequencing so that multiplication/division and/or conditional branch are not necessary.

(2-1-2)

In feature quantity where the correlation relationship between adjacent components is large, such as image feature quantity or acoustic feature quantity, etc., energy in the case where feature vector is considered as discrete signal deviates to lower frequency component.

In view of the above, Discrete Cosine Transform (DCT) represented by the following formulas (10), (11), and Discrete Fourier Transform (DFT) represented by the following formulas (12), (13) are used as orthogonal transform to conduct integration in order from low frequency component, thereby making it possible to perform integration in order from component of high significance. Thus, distance calculation is performed at a high speed.

$$D = \begin{bmatrix} D_{11} & \cdots & D_{1N} \\ \vdots & \cdots & \vdots \\ D_{N1} & \cdots & D_{NN} \end{bmatrix} \quad (10)$$

$$D_{mn} = \alpha(m-1)\cos\frac{(m-1)(2n-1)\pi}{2N}, \quad \alpha = \begin{cases} \sqrt{\frac{1}{N}} & (n=1) \\ \sqrt{\frac{2}{N}} & (n \neq 1) \end{cases} \quad (11)$$

$$F = \begin{bmatrix} F_{11} & \cdots & F_{1N} \\ \vdots & \cdots & \vdots \\ F_{N1} & \cdots & F_{NN} \end{bmatrix} \quad (12)$$

$$F_{mn} = \begin{cases} \sqrt{\frac{1}{N}} \cos\left(\frac{-2\pi(n/2-1)(m-1)}{N}\right) & (n\text{: even}) \\ \sqrt{\frac{1}{N}} \sin\left(\frac{-2\pi((n+1)/2-N/2)(m-1)}{N}\right) & (n\text{: odd}) \end{cases} \quad (13)$$

Here, since high speed transform method can be used for Discrete Cosine Transform or Discrete Fourier Transform, and since it is unnecessary to hold all transform matrixes, memory use quantity and/or operation speed in the case where operation is realized by computer are far advantageous as compared to the case where all calculations of matrix are performed.

(2-1-3)

The Walsh-Hadamard Transform is orthogonal transform where respective elements of transform matrix are constituted only by ±1, and is suitable for high speed transform because multiplication is not required at the time of transform. Here, sequency is used as concept close to frequency and components are arranged in order from low sequency so that high speed of distance calculation can be realized with respect to vectors where correlation relationship between adjacent components is large similarly to the above-described Discrete Cosine Transform or Discrete Fourier Transform.

The Walsh-Hadmard Transform matrix is constituted in accordance with codes of Fourier Transform matrix, or is constituted by recursive expansion operation of matrix. As an example, the Walsh-Hadamard Transform matrix W of the eighth order arranged in order of sequency is indicated by the following formula (14).

$$W = \frac{1}{\sqrt{8}} \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{bmatrix} \quad (14)$$

(2-1-4)

In the case where sufficient a number of sample vectors is collected in advance, and where a certain amount of cost can be required for transform operation, it is effective that optimum Karhunen-Loeve Transform (hereinafter referred to as KL transform) is used as orthogonal transform.

The KL transform matrix T is eigen matrix in which dispersion matrix V of sample vectors is decomposed into eigen values, and is defined as indicated by the following formula (15) in the case where eigen value is assumed as $\lambda_1, \ldots \lambda_N$.

$$V = T^t \Lambda T, \Lambda = \text{diag}\{\lambda_1, \lambda_2, \ldots, \lambda_N\} \quad (15)$$

Here, the KL transform is orthogonal transform matrix which completely removes correlation relationship between respective components, and dispersion of transformed vector components results in eigen value $\lambda_i$. Accordingly, the KL transform matrix T is constituted so that eigen values $\lambda_i$ are arranged in order of magnitude to thereby integrate all components to remove overlapping information thereafter to have ability to perform integration of distances from the axis where dispersion is the largest.

It is to be noted that, in the technique using this KL transform, since it is necessary to hold KL transform matrix T over the entire dimension in principle at the time of operation, and since it is necessary to perform matrix operation of all orders with respect to all vectors, operation cost is high. However, since this operation is performed at the time of registration, it cannot be said that time required for retrieval processing for which high speed is required is particularly increased.

In addition, although slight degradation of accuracy is involved, an approach is used to extract only vector components having a large eigen value to hold them without holding vector components a having small eigen value to thereby compress vector itself, thus also making it possible to reduce memory area and/or data read-in time of the recording unit 22 (FIG. 6).

(3) Third Embodiment

While the retrieval operation is caused to be conducted at a high speed by realization of high speed of distance calculation in the above-described first and second embodiments, data read-in time from the recording unit, e.g., hard disc, etc. also results in a large overhead in performing retrieval.

Here, the KL transform in the above-described second embodiment corresponds to analysis method called main component analysis in the multivariate analysis field, and is an operation for extracting main component constituting vector. In view of the above, in the third embodiment which will be explained below, the main component of transformed vector g' obtained in the second embodiment is recorded as index vector $g_1$, and the remaining component is recorded as detail vector $g_2$. At the time of retrieval, distance calculation is first performed with reference to index vector $g_1$ to acquire detail vector $g_2$ only in the case where that result is smaller than threshold value S to further perform distance calculation, thereby making it possible to shorten data read-in time.

Figure 9:
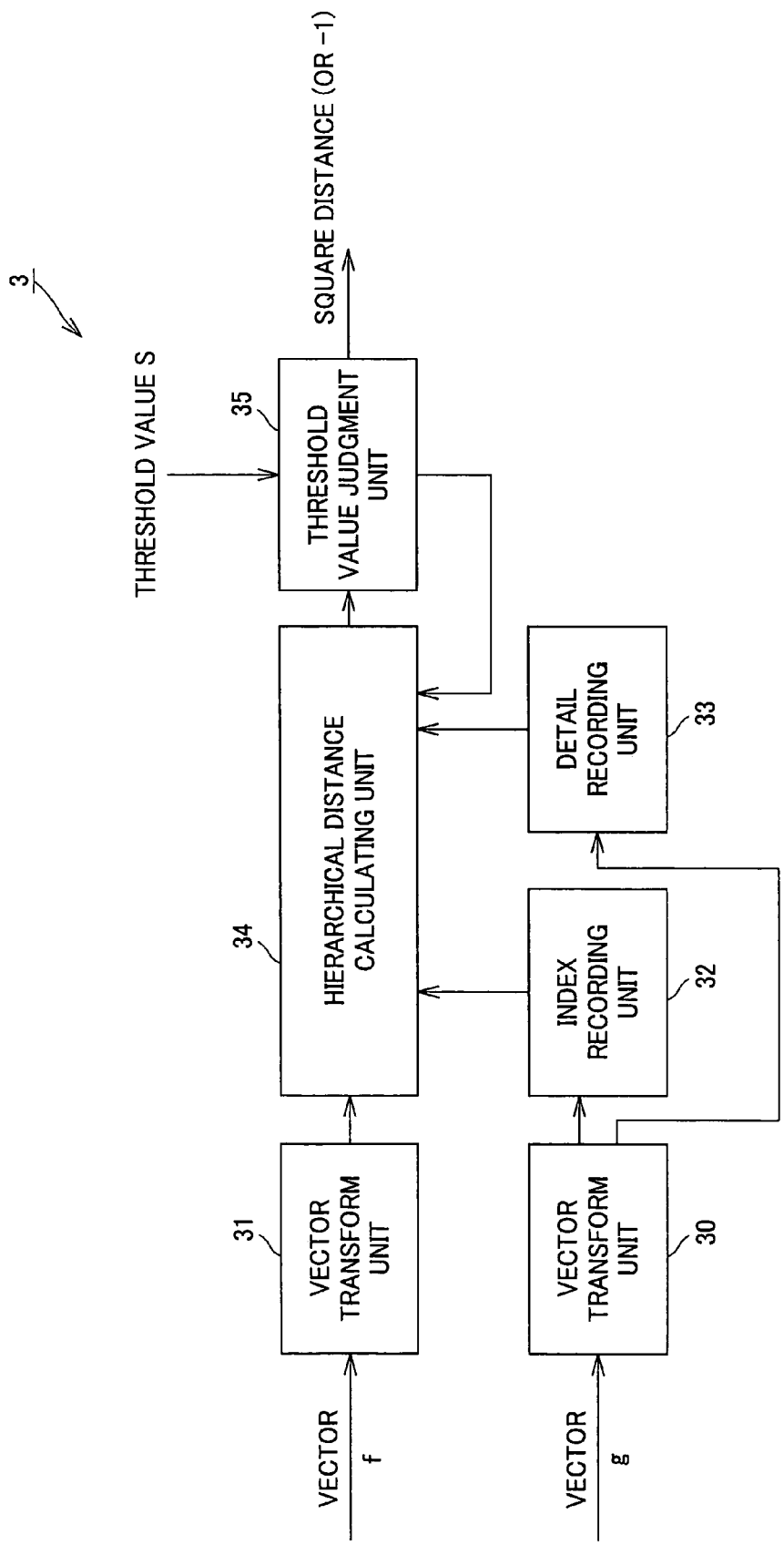
FIG. 9 is a block diagram illustrating an outline of the configuration of a similarity vector detecting apparatus in the third embodiment.

Outline of the configuration of the similarity vector detecting apparatus in the third embodiment is shown in FIG. 9. As shown in FIG. 9, the similarity vector detecting apparatus 3 serves to input vector f and vector g to output square distance between vectors (or −1), and is composed of vector transform units 30, 31, an index recording unit 32, a detail recording unit 33, a hierarchical distance calculating unit 34, and a threshold value judgment unit 35. Here, the vector converting units 30, 31 serve to respectively implement transform operation similar to the above-described second embodiment to the vectors g and f. In addition, the index recording unit 32 and the detail recording unit 33 are, e.g., magnetic disc, optical disc or semiconductor memory, etc.

Figure 10:
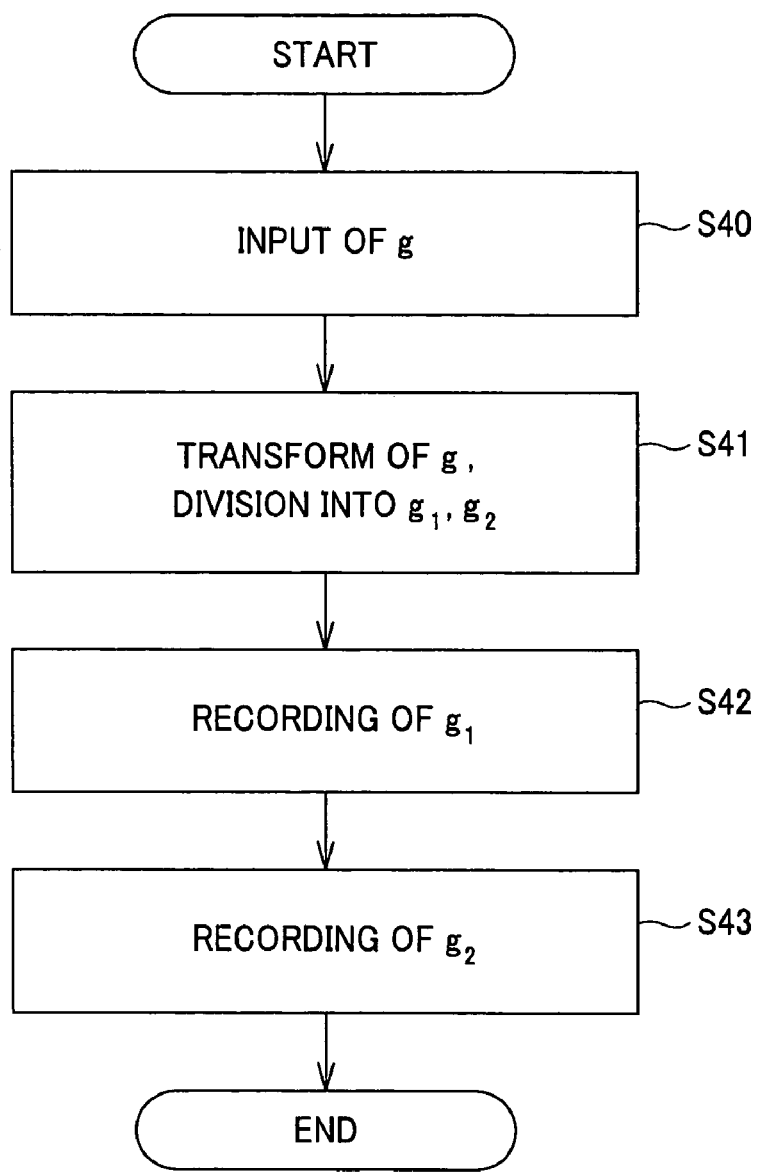
FIG. 10 is a flowchart illustrating the process at the time of vector registration in the similarity vector detecting apparatus.

The processing at the time of registration in this similarity vector detecting apparatus 3 will be explained by using the flowchart of FIG. 10. First, at step S40, the vector transform unit 30 (FIG. 9) inputs registered vector g in advance. At the subsequent step S41, vector g is transformed as indicated by the above-described formula (5) to generate vector g'. Further, the vector transform unit 30 divides it into index vector $g_1$ having a predetermined number M ($1 \leq M < N$) of components and detail vector $g_2$ having the remaining component in order from component having small component number, i.e., component having large dispersion or eigen value in the above-described transform operations or low frequency component. Further, at step S42, the index recording unit 32 records index vector $g_1$. At step S43, the detail recording unit 33 records detail vector $g_2$.

Figure 11:
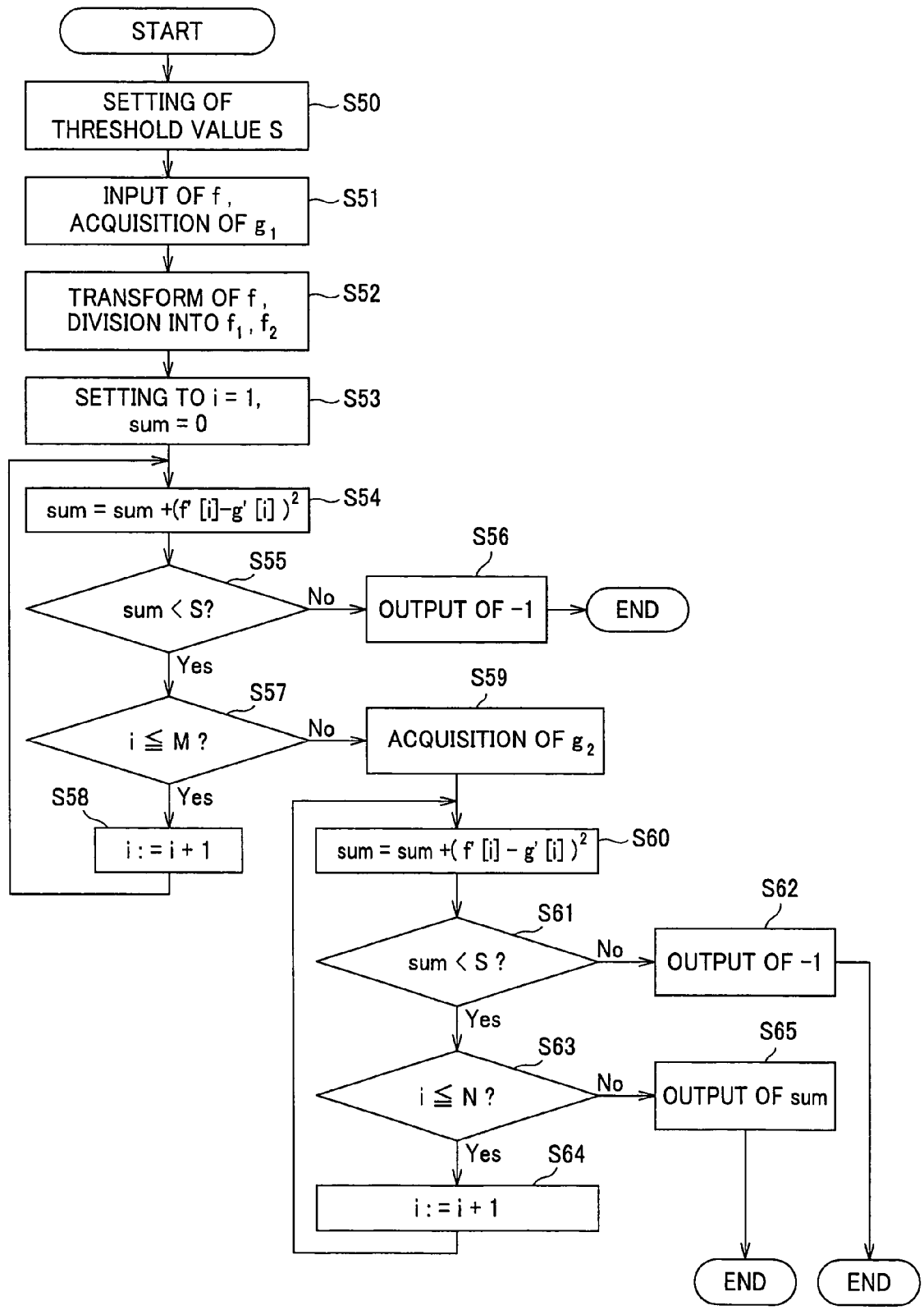
FIG. 11 is a flowchart illustrating the process at the time of vector retrieval in the similarity vector detecting apparatus.

Next, the processing at the time of retrieval in the similarity vector detecting apparatus 3 will be explained by using the flowchart of FIG. 11. First, at step S50, the threshold value judgment unit 35 (FIG. 9) sets threshold value S of distance. At the subsequent step S51, the vector transform unit 31 inputs vector f, and the hierarchical distance calculating unit 34 acquires one index vector $g_1$ recorded at the index recording unit 32.

Subsequently, at step S52, the vector transform unit 31 transforms vector f as indicated by the above-described formula (4) to generate vector f'. Further, the vector transform unit 31 divides it into index vector $f_1$ having a predetermined number M ($1 \leq M < N$) of components and detail vector $f_2$ having the remaining component in order from component having small component number.

At step S53, the hierarchical distance calculating unit 34 sets component number i serving as internal variable to 1 and sets integrated value sum of distance to 0. At step S54, integrating operation as indicated by the following formula (16) is performed between the i-th component f'[i] of vector f' and the i-th component g'[i] of vector g'.

$$\text{sum} = \text{sum} + (f'[i] - g'[i])^2 \quad (16)$$

At step S55, the threshold value judgment unit 35 discriminates whether or not integrated value sum is smaller than threshold value S. In the case where integrated value sum is smaller than threshold value S (Yes), processing proceeds to step S57. In the case where integrated value sum is threshold value S or larger (No), the threshold value judgment unit 35 outputs −1 at step S56 to complete processing. Here, as described above, −1 which is outputted is a convenient numerical value indicating that distance is above the threshold value so that it is nullified.

At step S57, it is discriminated whether or not component number i is the number of dimensions M of index vector $f_1$ and index vector $g_1$ or smaller. In the case where the component number i is M or smaller (Yes), i is incremented at step S58 to return to the step S54. On the other hand, in the case where component number i is larger than M (No), the hierarchical distance calculating unit 34 acquires one detail vector $g_2$ recorded at the detail recording unit 33.

At step S60, the hierarchical distance calculating unit 34 performs integrating operation as indicated by the above-described formula (16) between the i-th component f'[i] of vector f' and the i-th component g'[i] of vector g'.

At step S61, the threshold value judgment unit 35 discriminates whether or not integrated value sum is smaller than threshold value S. In the case where the integrated value sum is smaller than threshold value S (Yes), processing proceeds to step S63. In the case where integrated value sum is threshold value S or larger (No), the threshold value judgment unit 35 outputs −1 at step S62 to complete processing.

At step S63, it is discriminated whether or not the component number i is the number of dimensions N of vector f' or vector g' or smaller. In the case where the component number i is N or smaller (Yes), i is incremented at step S64 to return to the step S60. On the other hand, in the case where the component number i is larger than N (No), the threshold value judgment unit 35 outputs integrated value sum at step S65 since integration is completed until the last component of vector g' to complete processing. At this time, the integrated value sum results in square of distance between vectors.

While the processing with respect to one registered vector g' is indicated above in the flowchart of FIG. 11, similar processing is performed with respect to all registered vectors g' in practice to output, as vectors similar to vector f', all vectors g' in which integrated value sum of distances with respect to vector f' is below the threshold value S.

In the above-described third embodiment, as compared to the first and second embodiments, memory capacity and/or accuracy are not changed, and operating speed changes little. However, in the case where most comparisons are nullified at the stage of index vector $g_1$ so that it is unnecessary to acquire detail vector $g_2$, overhead by data access is cancelled.

While it is assumed in the above-described explanation that vector is divided into two stages of index vector and detail vector, it is a matter of course that there can be made expansion to multi-stage, such as, for example, index vector is further similarly divided into index vector of high order and detailed index vector so that three-stage configuration is provided.

(4) Extraction of Feature Vector

Explanation will be given below in connection with a technique of extracting feature vector from acoustic signal or video signal. In a manner described later, acoustic feature vector and/or image feature vector are extracted to use them as the above-described vectors f and g, thereby making it possible to retrieve, at a high speed, similar acoustic or video signal from registered acoustic signal or video signal by using the techniques of the above-described first to third embodiments in the case where acoustic signal or video signal is inputted.

(4-1) Extraction of Acoustic Feature Vector (4-1-1)

Figure 12:
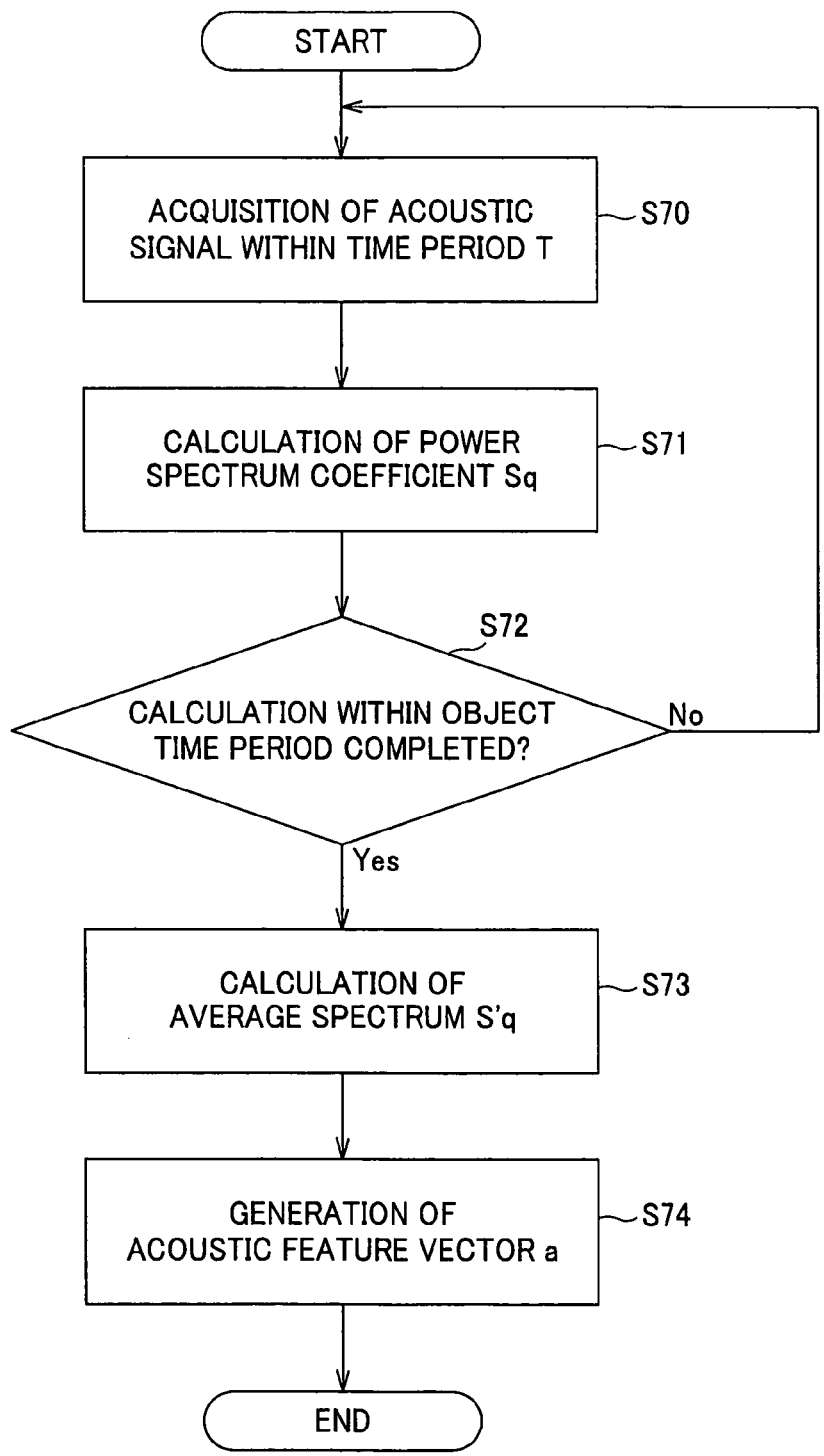
FIG. 12 is a flowchart illustrating an example of the process for extracting acoustic feature vector from acoustic signal.
Figure 13:
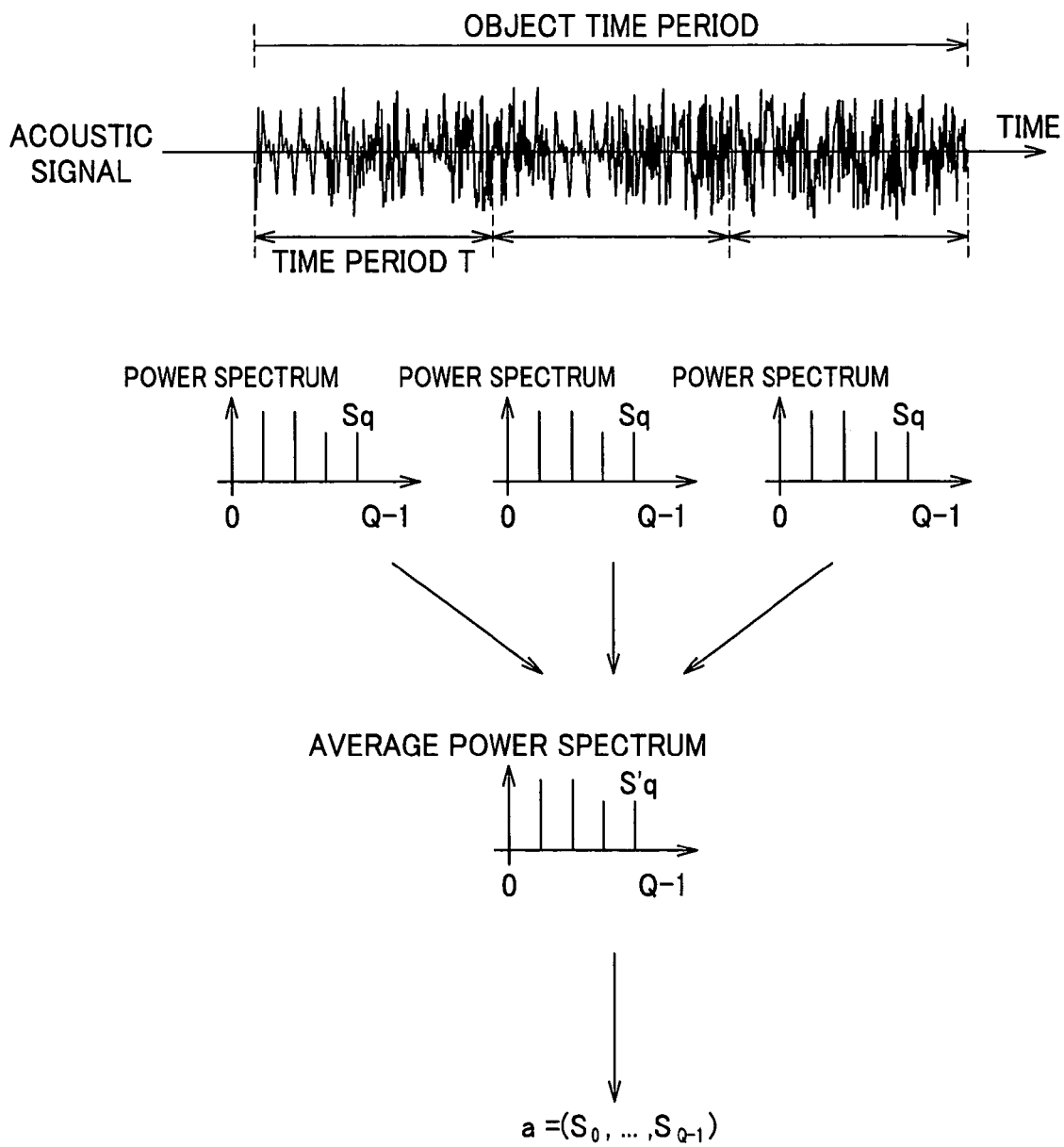
FIG. 13 is a graph illustrating an example of the process for extracting acoustic feature vector from acoustic signal.

Explanation will be given by using the flowchart of FIG. 12 and FIG. 13 in connection with the example of the case where power spectrum coefficients are used as feature quantity relating to acoustic signal. First, at step S70, as shown in FIG. 13, acoustic signals with respect to each time period T are acquired from acoustic signal within object time period.

Subsequently, at step S71, spectrum operation, e.g., high speed Fourier transform, is implemented to the acquired acoustic signal to determine power spectrum coefficients $S_q$ (q=0, 1, ..., Q−1) with respect to each short time period. Here, q is index representing discrete frequency and Q is the maximum discrete frequency.

Subsequently, at step S72, it is discriminated whether or not calculation within predetermined time period is completed. In the case where such calculation is completed (Yes), processing proceeds to step S73. In the case where such calculation is not completed (No), processing returns to the step S70.

At step S73, average spectrum S'q of the determined power spectrum coefficients $S_q$ is calculated. At step S74, this average spectrum $S'_q$ is changed into vector to generate acoustic feature vector a. This acoustic feature vector a is represented by the following formula (17).

$$a=(S_0, \ldots, S_{Q-1}) \quad (17)$$

It is to be noted that while explanation has been given in the above-described example on the premise that acoustic signal within object time period is divided into each time period T, spectrum operation may be implemented without dividing into each time period T in the case where the object time period is short.

In addition, while the example using power spectrum coefficient has been explained in the above-described example, the present invention is not limited to such implementation but spectrum coefficient having equivalent information, etc., may also be used. Further, in place of Fourier transform, similar effect can also be obtained by linear predictive coefficient using AR (Auto-Regressive) model.

(4-1-2)

Since the acoustic signal is vast, there are many instances where such signal is recorded or is caused to undergo transmission after being compression-encoded. While it is possible to extract acoustic feature vector a by using the above-described technique after encoded acoustic signal is decoded into signal in the base band, extracting processing can be conducted efficiently and at a high speed if acoustic feature vector a can be extracted only by partial decoding.

Figure 14:
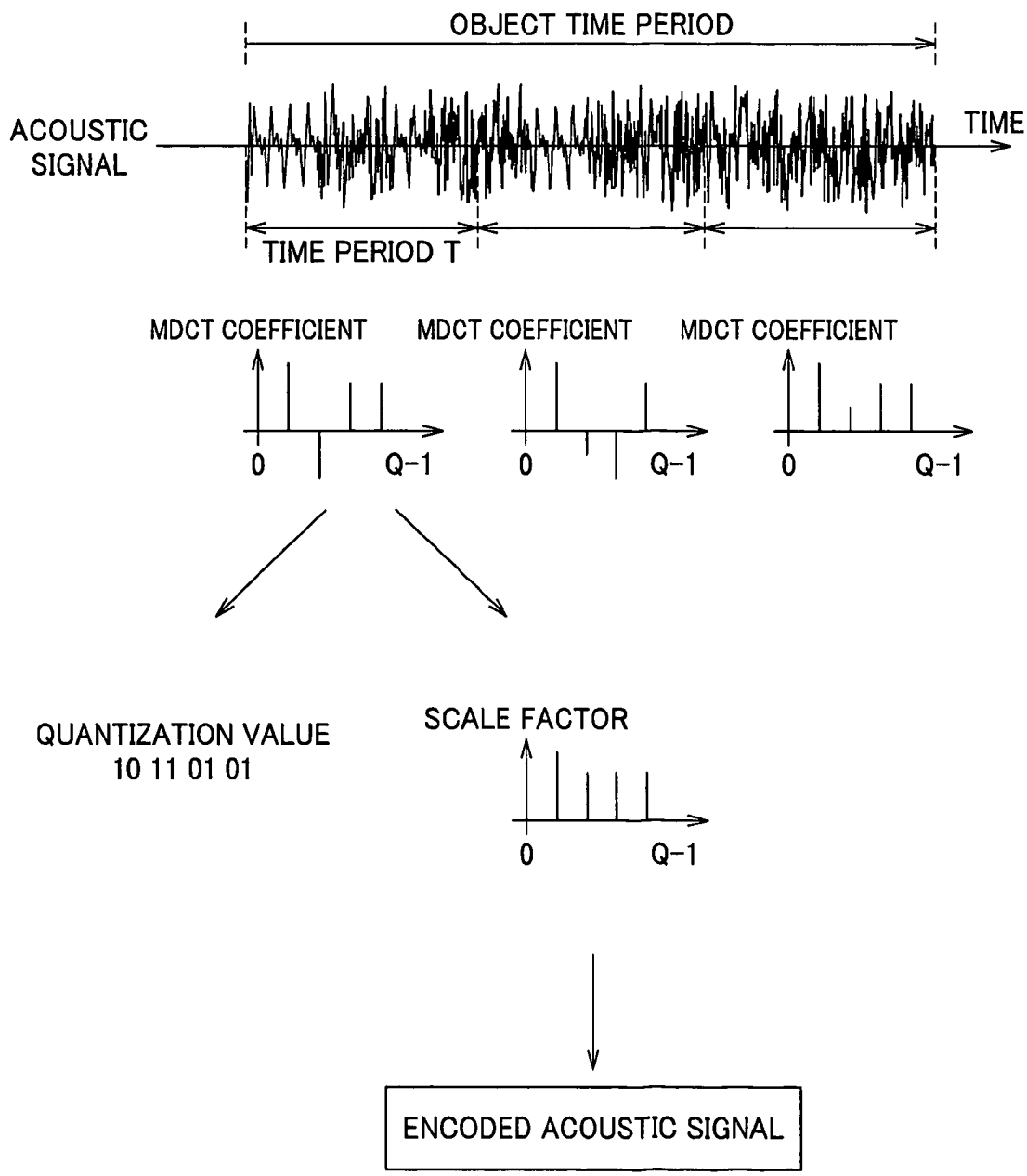
FIG. 14 is a graph illustrating a transform encoding in acoustic signal.

Here, in the transform encoding which is the encoding method generally used, acoustic signal serving as original sound is divided into frames with respect to each time period T, as shown in FIG. 14. Further, orthogonal transform such as Modified Discrete Cosine Transform (MDCT), etc. is implemented to acoustic signal with respect to each frame, and the coefficients thereof are quantized and encoded. In this instance, scale factors serving as normalization coefficient of magnitude are extracted with respect to each frequency band, and are separately encoded. In view of the above, by decoding only the scale factors, they can be used as acoustic feature vector a.

Figure 15:
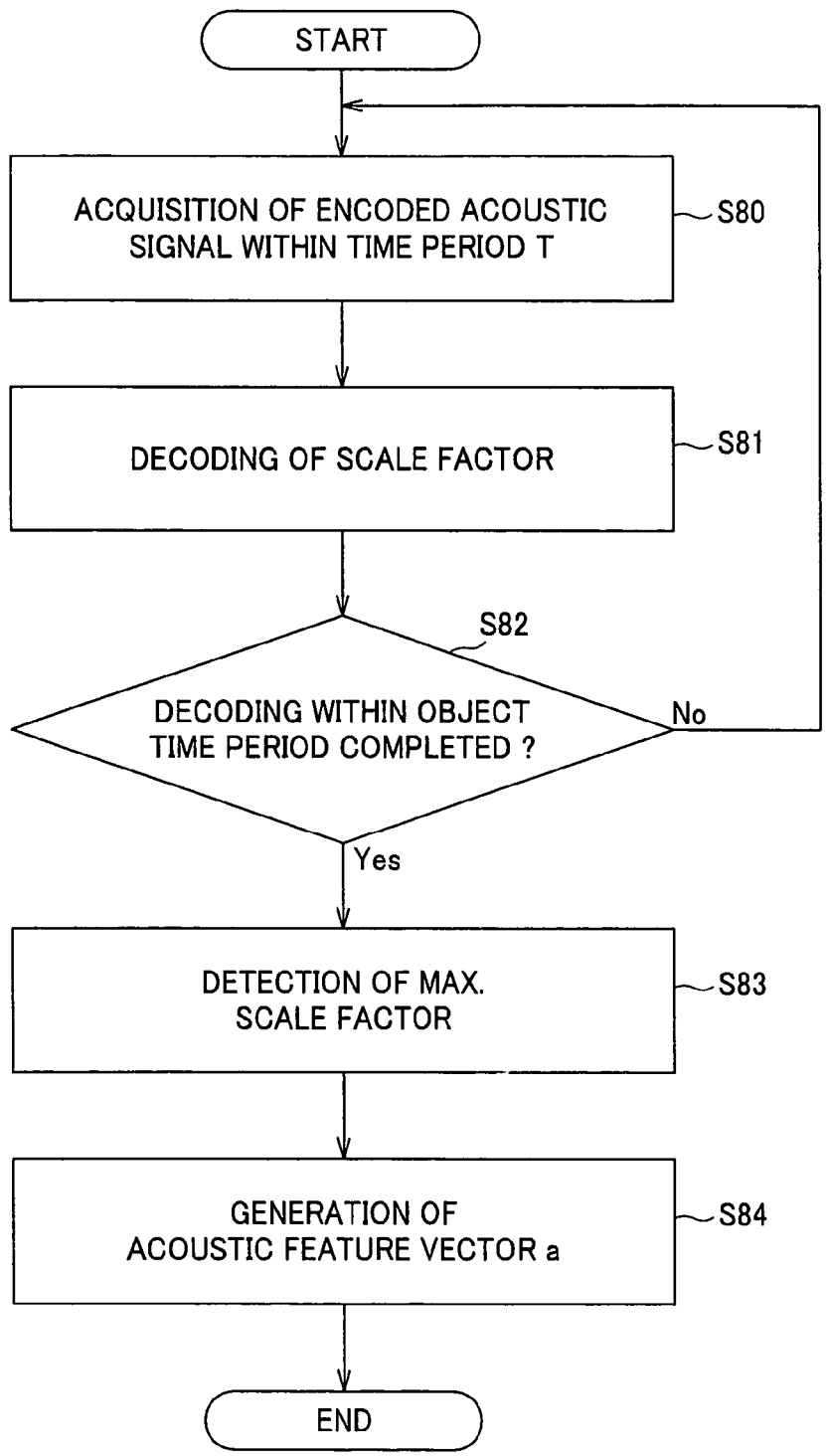
FIG. 15 is a flowchart illustrating an example of the process for extracting acoustic feature vector from encoded acoustic signal.
Figure 16:
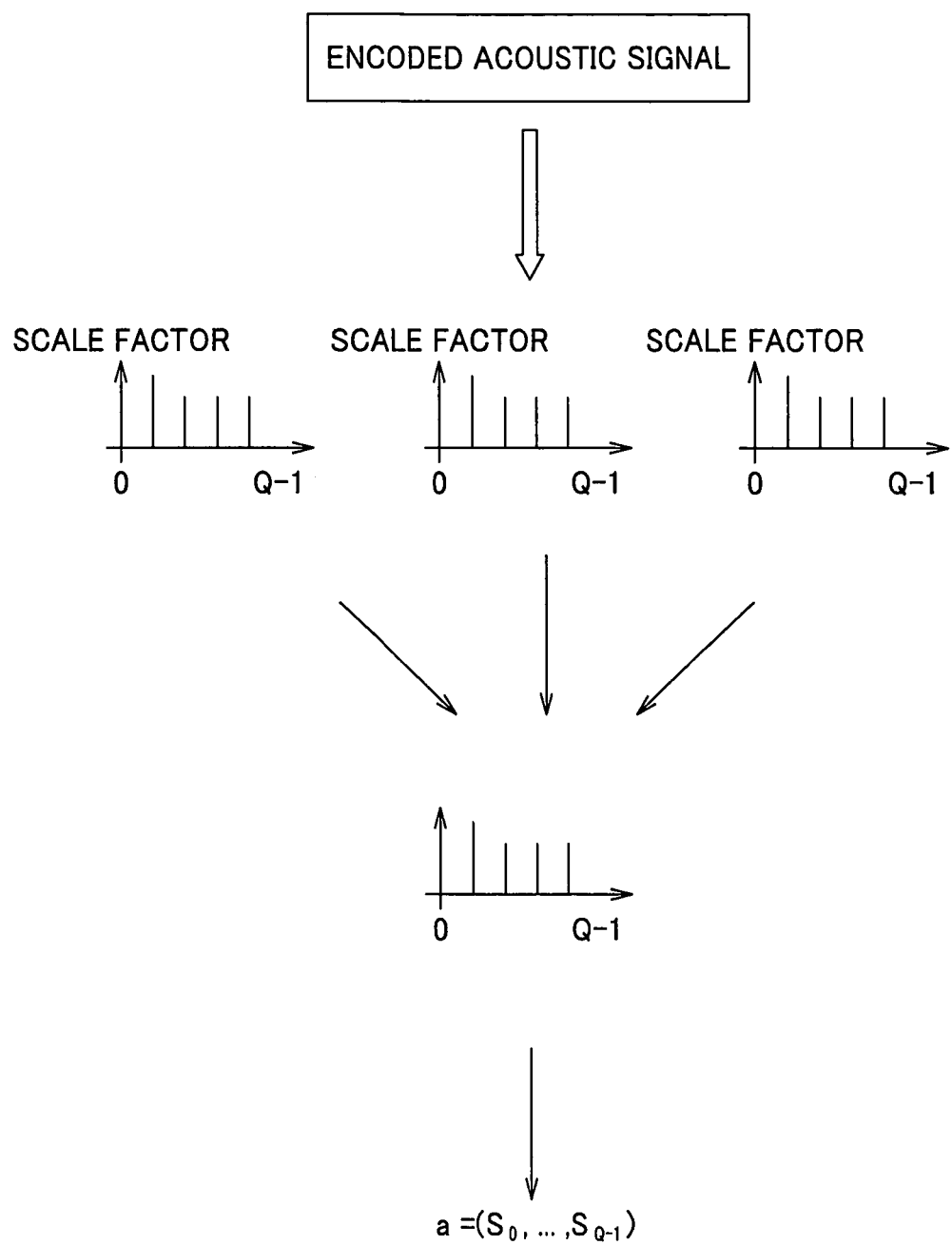
FIG. 16 is a graph illustrating an example of the process for extracting acoustic feature vector from encoded acoustic signal.

Explanation will be given by using the flowchart of FIG. 15 and FIG. 16 in connection with the example of the case where scale factors are used as feature quantity relating to acoustic signal. First, at step S80, encoded acoustic signal within the time period T in the object time period is acquired. At step S81, scale factors with respect to each frame are partially decoded.

Subsequently, at step S82, it is discriminated whether or not decoding within the object time period is completed. In the case where such decoding is completed (Yes), processing proceeds to step S83. In the case where such decoding is not completed (No), processing returns to the step S80.

At step S83, maximum scale factors are detected with respect to each band from scale factors within the object time period. At step S84, those scale factors are changed into vectors to generate acoustic feature vector a.

In this way, it is possible to extract, at a high speed, acoustic feature vector a equivalent to the above without completely decoding encoded acoustic signal.

(4-2) Extraction of Image Feature Vector (4-2-1)

Figure 17:
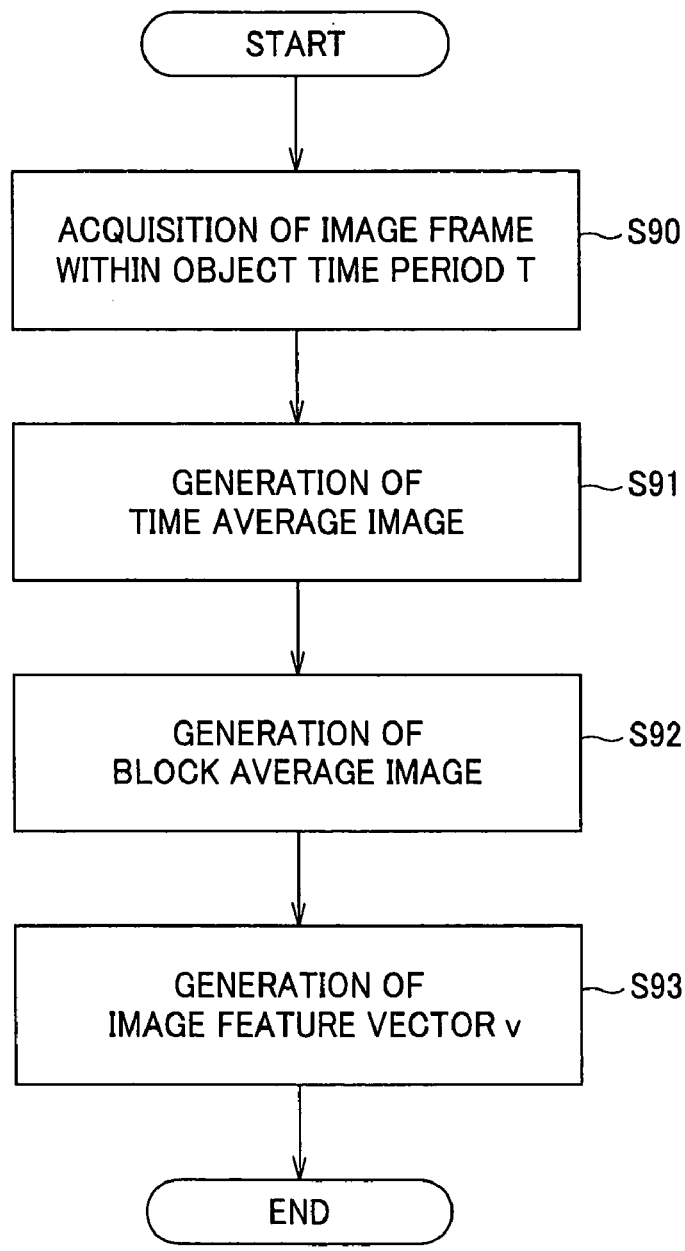
FIG. 17 is a flowchart explaining an example of the process for extracting image feature vector from video signal.
Figure 18:
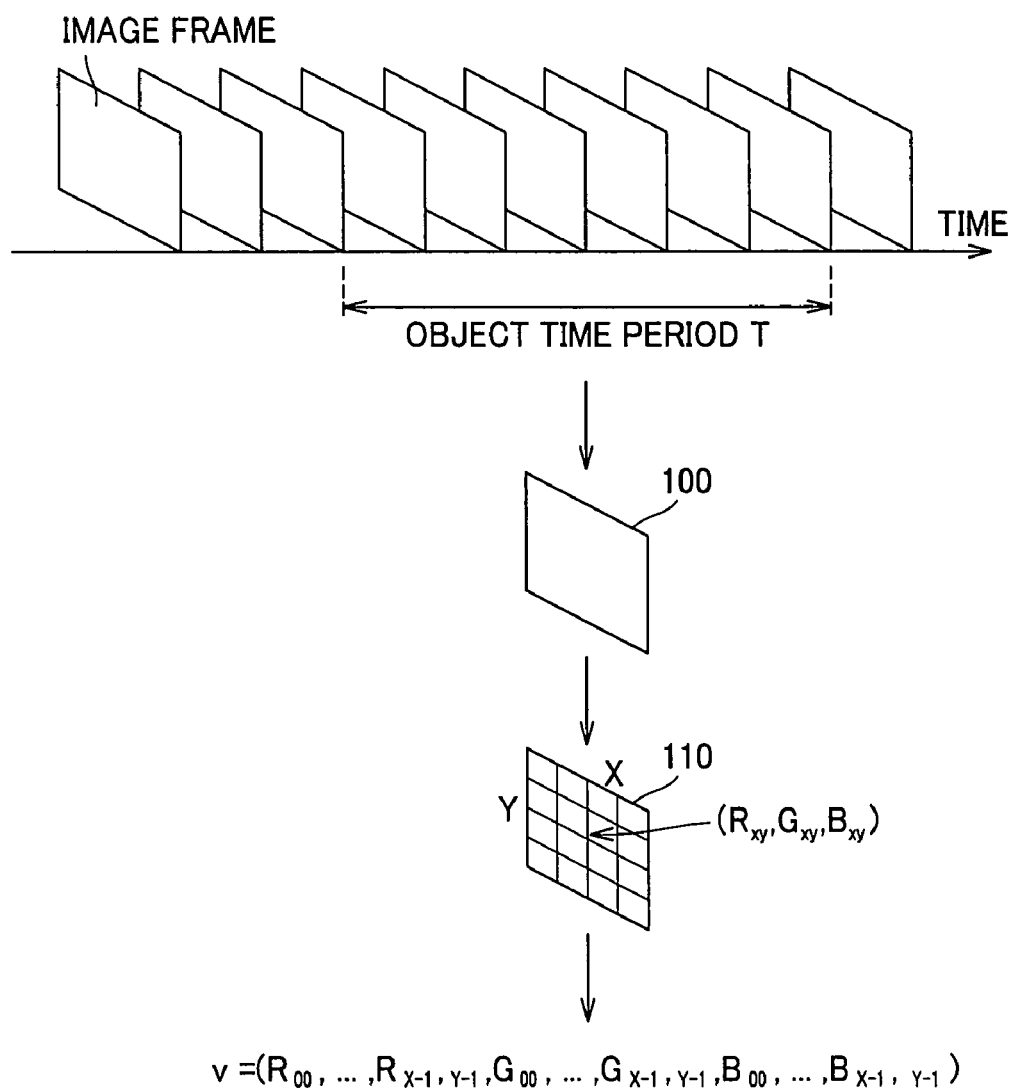
FIG. 18 is a graph illustrating an example of the process for extracting image feature vector from video signal.

Explanation will be given by using the flowchart of FIG. 17 and FIG. 18 in connection with the example of the case where luminance information and color information are used as feature quantity relating to video signal. First, at step S90, as shown in FIG. 18, image frame is acquired from video signal within the object time period T.

Subsequently, at step S91, time average image 100 is prepared on the basis of acquired all image frames.

Subsequently, at step S92, the prepared time average image 100 is divided into X×Y small blocks in breadth and width directions to prepare block average image 110 in which pixel values within respective blocks are averaged.

Further, at step S93, these small blocks are arranged in order of R, G, B, e.g., from the left upper direction toward the right lower direction to generate one-dimensional image feature vector v. This image feature vector v is represented by the following formula (18).

$$v = (R_{00}, \ldots, R_{X-1,Y-1}, G_{00}, \ldots, B_{00}, \ldots, B_{X-1,Y-1}) \quad (18)$$

It is to be noted that explanation has been given in the above-described example in connection with the example where pixel values of the block average image 110 in which the time average image 100 is divided are rearranged to generate one-dimensional image feature vector v, however, the present invention is not limited to such implementation, but there may be employed an approach to rearrange pixel values of the time average image 100 without preparing the block average image 110 to generate one-dimensional image feature vector v.

In addition, since time change of video signal is not so rapid in the ordinary state, it is also possible to obtain the same effects/advantages by employing an approach to select, as representative image, one frame within the object time period without preparing the time average image 100 to substitute it.

(4-2-2)

There are many instances where there exist a certain relation in images where distribution of color with respect to all images is similar, e.g., studio image, etc. photographed from the same angle of news image even in the case where corresponding video signal is not entirely the same video signal. Thus, there is a demand for performing retrieval in the state where these images are considered to be the same. In such case, it is effective to employ a method of rejecting spatial dependency of image to prepare histogram of color distribution to make comparison.

Figure 19:
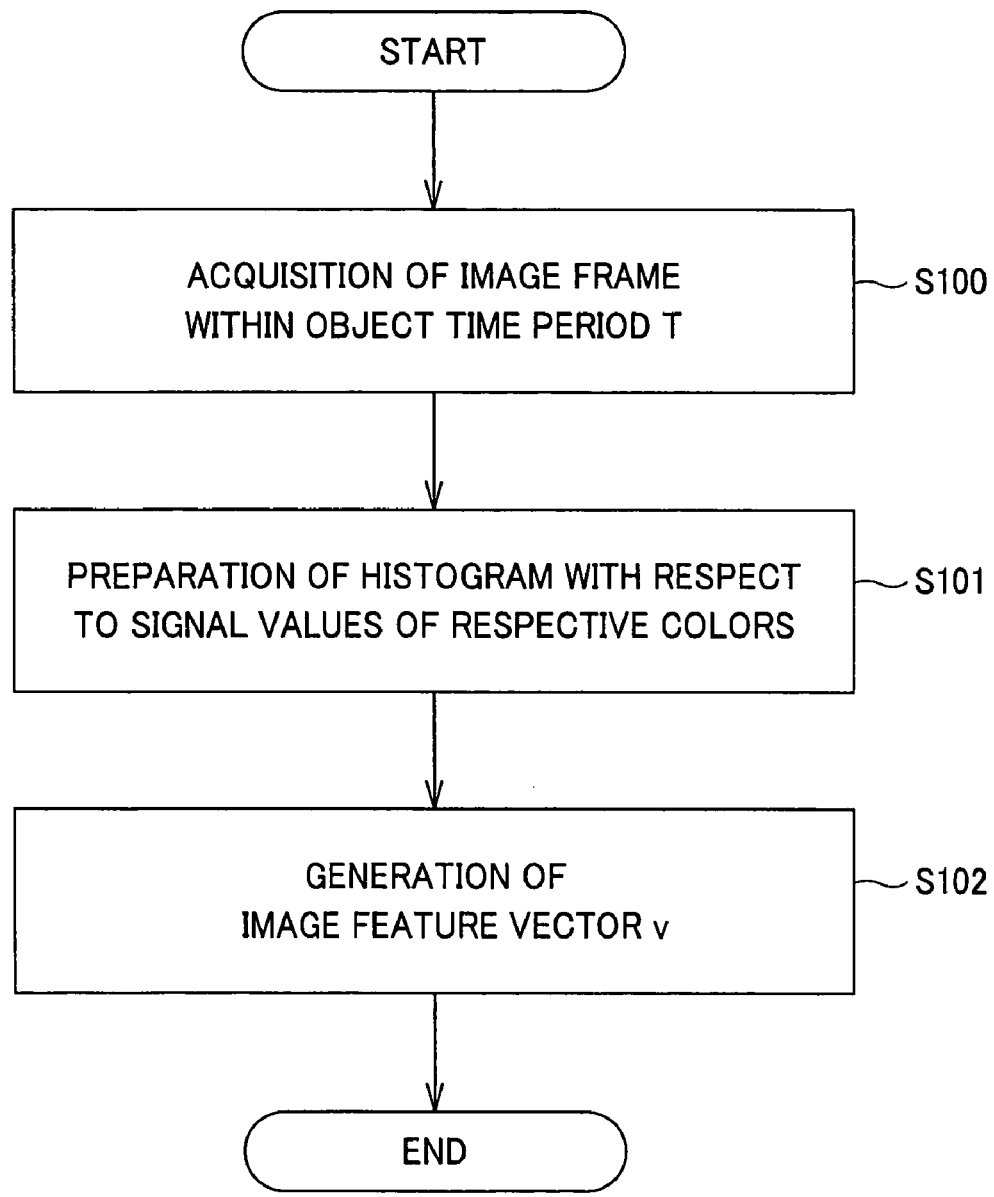
FIG. 19 is a flowchart illustrating another example of the process for extracting image feature vector from video signal.
Figure 20:
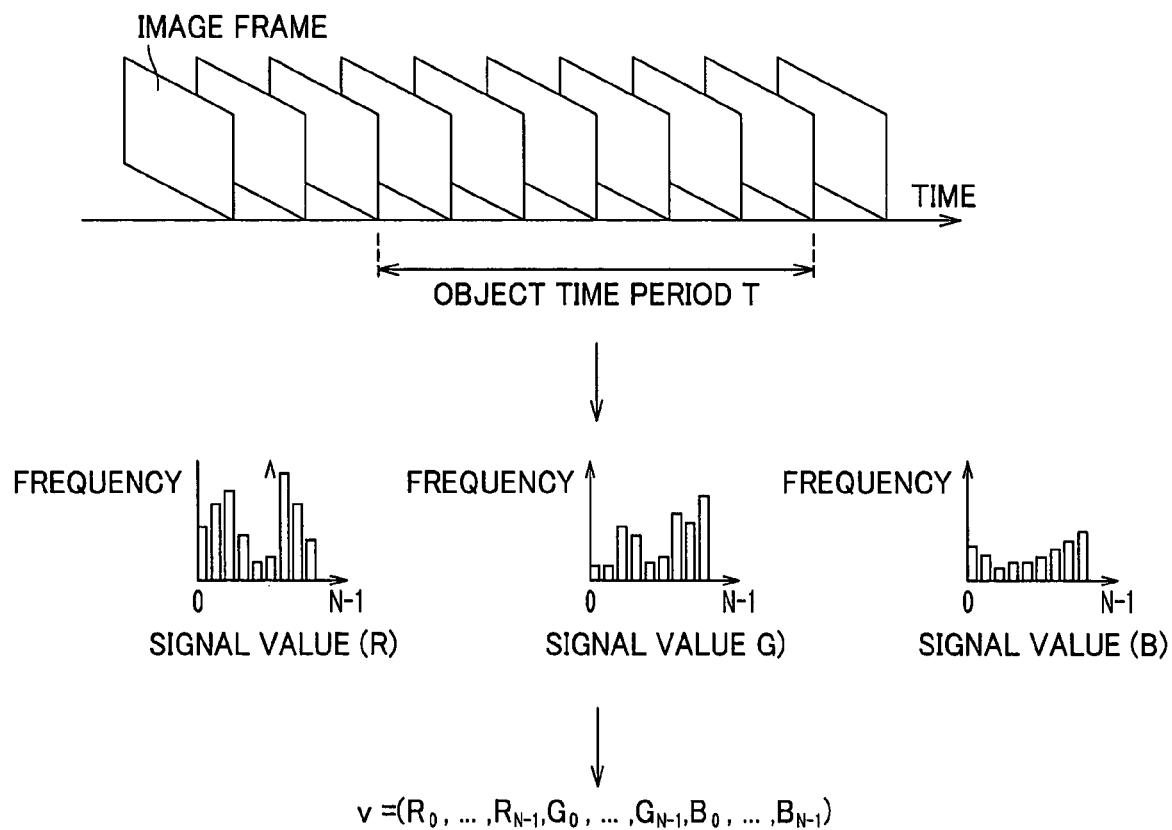
FIG. 20 is a graph illustrating a further example of the process for extracting image feature vector from video signal.

In view of the above, explanation will be given by using the flowchart of FIG. 19 and FIG. 20 in connection with the example of the case where histogram of color distribution is used as feature quantity in this way. First, at step S100, as shown in FIG. 20, image frame is acquired from video signal within object time period T.

Subsequently, at step S101, histogram with respect to signal values of respective colors, e.g., R, G, B is prepared from signal values of respective image frames.

Further, at step S102, these colors are arranged in order of, e.g., R, G, B to generate one-dimensional image feature vector v. This image feature vector v is represented by the following formula (19).

$$v = (R_0, \ldots, R_{N-1}, G_0, \ldots, G_{N-1}, B_0, \ldots, B_{N-1}) \quad (19)$$

It is to be noted that while explanation has been given in the above-described example on the premise that histogram with respect to signal values of R, G, B is prepared, it is possible to obtain similar effects/advantages even if a histogram with respect to signal values of luminance (Y) and color difference (Cb, Cr) is prepared.

(4-2-3)

Since video signal is vast, there are many cases where such signal is recorded or is caused to undergo transmission after being compression-encoded. While it is possible to extract image feature vector v by using the above-described technique after employing an approach to decode encoded video signal into signal of base band, extraction processing can be performed efficiently and at a high speed if image feature vector v can be extracted only by partial decoding.

Figure 21:
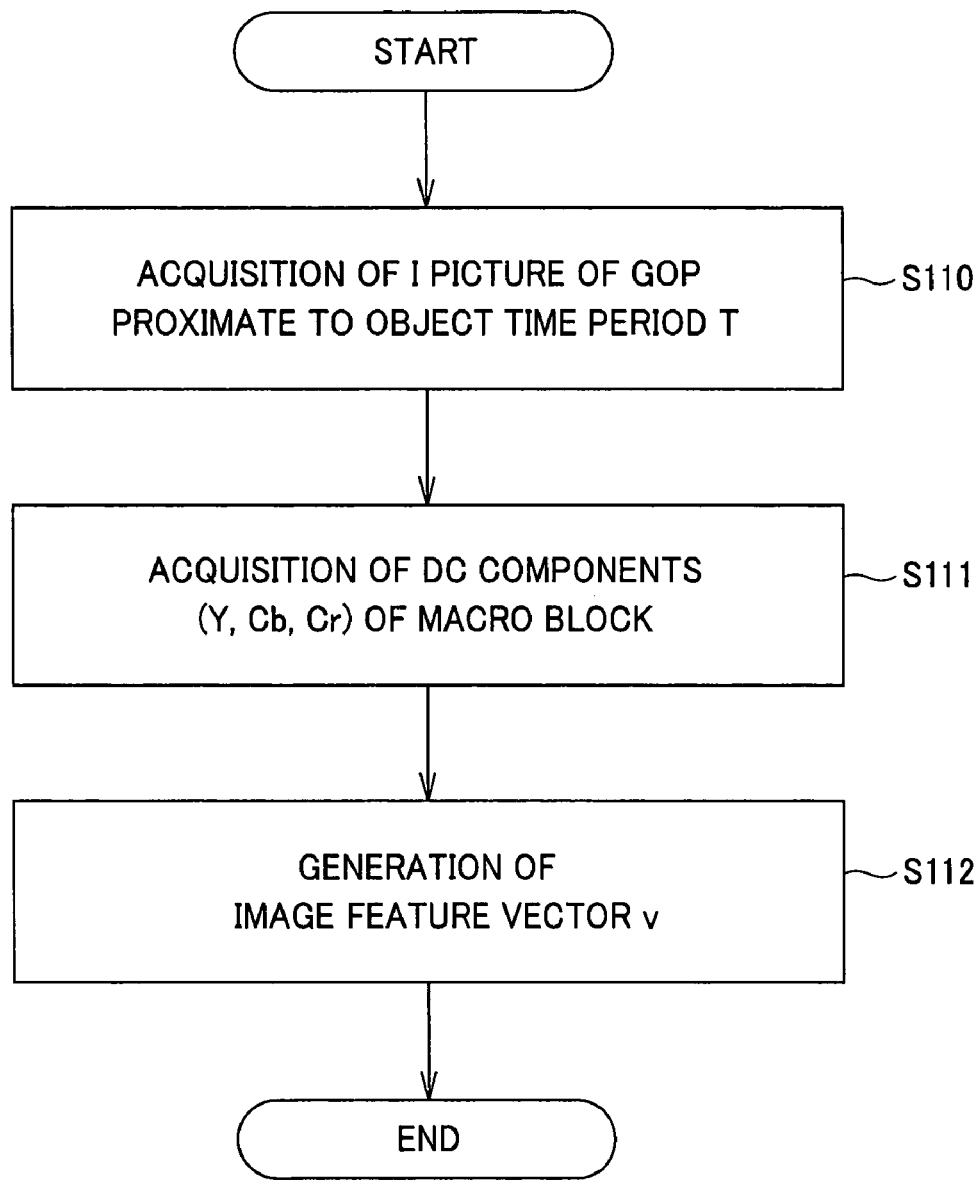
FIG. 21 is a flowchart illustrating a further example of the process for extracting image feature vector from encoded video signal.
Figure 22:
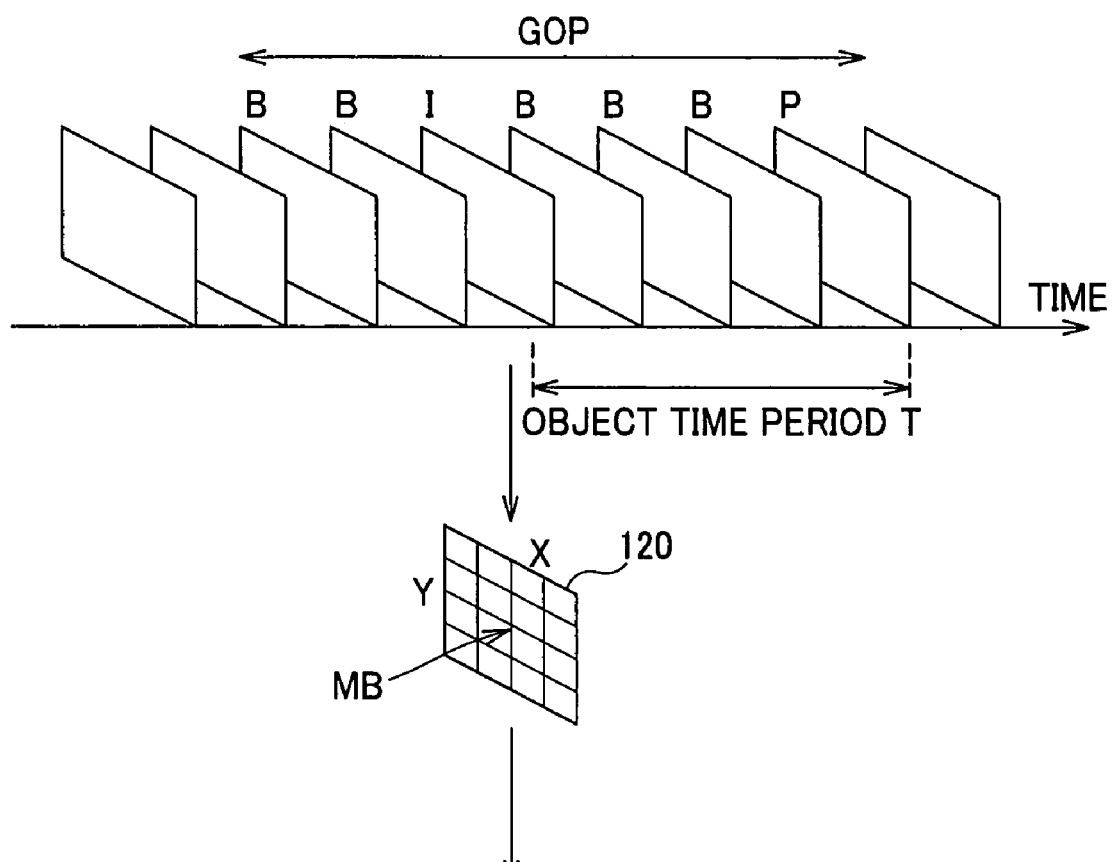
FIG. 22 is a graph illustrating a further example of the process for extracting image feature vector from encoded video signal.

Explanation will be given by using the flowchart of FIG. 21 and FIG. 22 in connection with the example of the case where image feature vector v is extracted from video signal compression-encoded by MPEG1 (Moving Picture Experts Group 1) or MPEG2. First, at step S110, encoded video signal of encoded group (Group of pictures: GOP) proximate to object time period T to be changed into vector is acquired to acquire intra-frame encoded picture (I picture) 120 within that GOP.

Here, frame image is encoded with macro block MB (16×16 pixels, or 8×8 pixels) being as unit, and Discrete Cosine Transform (DCT) is used. These DC-transformed DC coefficients correspond to average value of pixel values of image within macro block.

In view of the above, at step S111, these DC coefficients are acquired. At the subsequent step S112, these coefficients are arranged in order of, e.g., Y, Cb, Cr to generate one-dimensional image feature vector v. This image feature vector v is represented by, e.g., the following formula (20).

$$v = (Y_{00}, \ldots, Y_{X-1,Y-1}, Cb_{00}, \ldots, Cb_{X-1,Y-1}, Cr_{00}, \ldots, Cr_{X-1,Y-1}) \quad (20)$$

In this way, it is possible to extract image feature vector v at a high speed without completely decoding encoded video signal.

It is to be noted that while explanation has been given in the above-described example that video signal which has been compression-encoded by the MPEG1 or the MPEG2 is assumed to be used, the present invention may also be applied to other compression-encoding systems.

(5) Others

As explained above, in accordance with this embodiment, hierarchical distance integrating operation is performed in detecting analogous (similar) vector on the basis of distance between vectors to truncate distance integrating operation at the time when integrated value of distances is above threshold value with respect to distance set in advance, thereby making it possible to detect similar vector at a high speed. Particularly, in such cases that a vector similar to input vector is detected from a large quantity of registered vectors, since most registered vectors are non-similar so that integrated value of distances is above threshold value, distance calculation can be truncated at the early stage. Thus, detection time can be shortened to a large extent.

In addition, by implementing sequential transform, Discrete Cosine Transform, Discrete Fourier Transform, Walsh-Hadamard Transform or KL Transform in advance to vector to perform integrating operation in order from vector component having high significance, i.e., component having large dispersion or eigen value in the above-described transform operations or in order from low frequency component, it is possible to detect similar vector efficiently and at a high speed, taking the distribution of vector components into consideration.

Accordingly, also in performing retrieval of acoustic signal or video signal, acoustic feature vector and/or image feature vector is extracted in advance to register the vector thus extracted, whereby in the case where arbitrary acoustic signal or video signal is inputted, similar acoustic or video signals can be retrieved at a high speed while maintaining structural simplicity and/or retrieval accuracy similar to full search.

While the invention has been described in accordance with certain embodiments thereof illustrated in the accompanying drawings and described in the above description in detail, it should be understood by those ordinarily skilled in the art that the invention is not limited to the embodiments, but various modifications, alternative embodiments or equivalents can be implemented without departing from the scope and spirit of the present invention as set forth and defined by the appended claims.

For example, while the present invention has been explained in the above-described embodiments as the configuration of hardware, the present invention is not limited to such implementation, but arbitrary processing may be also realized by allowing CPU (Central Processing Unit) to execute a computer program. In this case, computer program may be provided in the state where it is recorded on recording medium, or may be provided by allowing it to undergo transmission through other transmission medium such as Internet.

INDUSTRIAL APPLICABILITY

In accordance with the above-described present invention, there is employed such approach to perform distance calculation between two vectors in a hierarchical manner, whereby in the case where that integrated value of distances calculated up to a certain hierarchy is above a predetermined threshold value, it is only detected, without calculating actual distance, that the integrated value of distances is threshold value or larger, thereby permitting operation to be conducted at a high speed. Particularly, in such cases that a vector similar to an input vector is detected from a large quantity of registered vectors, since most registered vectors are non-similar and thus integrated value of distances is above threshold value, distance calculation can be truncated at the early stage. Therefore, detection time can be shortened to a large extent.

The invention claimed is:

1. A similarity calculation method of determining similarity between two input vectors, each of the two input vectors having N corresponding components, N being an integer greater than zero, said method comprising the steps of:
   calculating a distance between the two input vectors in a component-wise hierarchical manner,
   comparing an integrated value of distances calculated incrementally for hierarchically higher-order components of the two vectors with a predetermined threshold value,
   controlling distance calculation in accordance with a result of the threshold value comparison, and
   outputting, as the similarity, the integrated value of the calculated distances up to the last components of the two vectors,
   wherein,
   the control is conducted such that the distance calculation is truncated in the case where the integrated value of distances calculated up to a certain component order is greater or equal to the threshold value.

2. The similarity calculation method as set forth in claim 1, wherein,
   the distance calculation between respective components constituting the two input vectors is performed in a component-wise hierarchical manner and
   in the case where the integrated value of distances calculated up to a certain component order is below the threshold value, the distance calculation between next higher-order components is performed.

3. The similarity calculation method as set forth in claim 2, further comprising:
   implementing a predetermined transform operation to the two input vectors,
   wherein,
   the distance calculation between the two transformed input vectors is performed in a predetermined order based on the predetermined transform operation.

4. The similarity calculation method as set forth in claim 3, wherein,
   the predetermined transform operation is a transform operation which performs sequencing of order of respective components constituting the two input vectors in accordance with magnitude of dispersion of the respective components, and
   the distance calculation between the two transformed input vectors is performed in order from components of large dispersion at the distance calculation step.

5. The similarity calculation method as set forth in claim 3, wherein,
   the predetermined transform operation is a Discrete Cosine Transform operation or Discrete Fourier Transform operation, and
   the distance calculation between the two transformed input vectors is performed in order from low frequency component.

6. The similarity calculation method as set forth in claim 3, wherein,
   the predetermined transform operation is Walsh-Hadamard Transform operation, and
   the distance calculation between the two transformed input vectors is performed in order from low frequency component.

7. The similarity calculation method as set forth in claim 3, wherein,
   the predetermined transform operation is a Karhunen-Loeve transform operation, and
   the distance calculation between the two transformed input vectors is performed in order from component of large eigenvalue.

8. The similarity calculation method as set forth in claim 3, further comprising:
   dividing component-wise the two transformed input vectors into a plurality of component-wise hierarchical partial vectors
   wherein,
   the distance calculation between respective components constituting partial vectors is performed in a component-wise hierarchical manner in order from the partial vector of the uppermost component order, and
   in the case where the integrated value of calculated distances between all components constituting partial vectors through to a certain component order is below the threshold value, the distance calculation between respective components constituting partial vector of the next lower component order is performed.

9. The similarity calculation method as set forth in claim 1, wherein,
   the input vector is obtained by changing an acoustic signal into a feature vector, and
   the feature vector is obtained by changing power spectrum coefficients within a predetermined time period of the acoustic signal into vector.

10. The similarity calculation method as set forth in claim 1, wherein,
the input vector is obtained by changing an acoustic signal into feature vector, and
the feature vector is obtained by changing linear predictive coefficients within a predetermined time period of the acoustic signal into vector.

11. The similarity calculation method as set forth in claim 1, wherein,
the input vector is obtained by changing an encoded acoustic signal into feature vector, and
the feature vector is obtained by changing parameters indicating intensities of frequency components within respective frames of the encoded acoustic signal into vectors.

12. The similarity calculation method as set forth in claim 1, wherein,
the input vector is obtained by changing a video signal into feature vector, and
the feature vector is obtained by changing signal value of representative image within a predetermined time period of the video signal, average image of frame image within the predetermined time period, or small image obtained by dividing, on predetermined block unit basis, the representative image or the average image into vector.

13. The similarity calculation method as set forth in claim 1, wherein,
the input vector is obtained by changing a video signal into feature vector, and
the feature vector is obtained by changing histogram with respect to luminance and/or color of frame image within a predetermined time period of the video signal into vector.

14. The similarity calculation method as set forth in claim 1, wherein,
the input vector is obtained by changing encoded video signal into feature vector, and
the feature vector is obtained by changing signal values of DC components of respective blocks serving as encoding unit of intraframe encoding image proximate to a predetermined time period of the encoded video signal into vector.

15. A similarity calculating apparatus adapted for determining similarity between two input vectors, comprising:
a distance calculating unit for performing a distance calculation between the two input vectors in a component-wise hierarchical manner,
a threshold value comparing unit for comparing an integrated value of distances calculated incrementally for hierarchically higher-order components of the two vectors-by the distance calculating unit with a predetermined threshold value,
a control unit for controlling the distance calculation in accordance with a result by the threshold value comparing unit, and
an output unit for outputting, as the similarity, the integrated value of distances calculated up to the last components of the two vectors,
wherein,
the control unit is operative so that in the case where integrated value of distances calculated up to a certain component order is above the threshold value as the result of comparison by the threshold comparing unit, a control is performed so as to truncate the distance calculation.

16. The similarity calculating apparatus as set forth in claim 15, wherein,
the distance calculating unit performs distance calculation between respective components constituting the two input vectors in a component-wise hierarchical manner, whereby in the case where integrated value of distances calculated up to a certain component order is below the threshold value, the distance calculation is performed between the next order components.

17. The similarity calculating apparatus as set forth in claim 16, further comprising:
a transform unit for implementing a predetermined transform operation to the two input vectors,
wherein,
the distance calculating unit performs distance calculation between the two input vectors transformed by the transform unit in a predetermined order based on the predetermined transform operation.

18. The similarity calculating apparatus as set forth in claim 17, which comprises a dividing unit for taking out, in the predetermined order, respective components constituting the two input vectors transformed by the transform unit to divide them into a plurality of partial vectors,
wherein,
the distance calculating unit performs, in a component-wise hierarchical manner, the distance calculation between respective components constituting partial vectors in order from the partial vector of the uppermost rank component, and
in the case where the integrated value of calculated distances calculated between all components constituting partial vectors through to a certain component order is below the threshold value, the distance calculating unit performs the distance calculation between respective components constituting partial vector of one lower component order.

19. A computer readable medium comprising instructions which when executed by a computer system causes the computer to implement a program for allowing a computer to execute similarity calculation processing for determining similarity between two input vectors, the program comprising:
calculating a distance between the two input vectors in a component-wise hierarchical manner,
comparing integrated value of distances calculated incrementally for hierarchically higher-order components of the two vectors with a predetermined threshold value,
controlling the distance calculation at the distance calculation step in accordance with a result of the threshold value comparison, and
outputting, as the similarity, integrated value of distances calculated up to the last components of the two vectors,
wherein,
in the case where the integrated value of distances calculated up to a certain component order is greater or equal to the threshold value, control is conducted in such a manner to truncate the distance calculation.

20. The program as set forth in claim 19, wherein,
the distance calculation between respective components constituting the two input vectors is performed in a component-wise hierarchical manner and
in the case where the integrated value of distances calculated up to a certain component order is below the threshold value, the distance calculation between next higher-order components is performed.

21. The program as set forth in claim 20, further comprising:

implementing a predetermined transform operation to the two input vectors, wherein, at the distance calculation step, distance calculation between the transformed two input vectors is performed in a predetermined order based on the predetermined transform operation.

22. The program as set forth in claim 21, further comprising:

dividing component-wise the two input into a plurality of component-wise hierarchical partial vectors, wherein, the distance calculation between respective components constituting partial vectors is performed in a component-wise hierarchical manner in order from the partial vector of the uppermost component, and in the case where the integrated value of calculated distances between all components constituting partial vectors through to a certain component order is below the threshold value, the distance calculation between respective components constituting partial vector of one lower component-order is performed.

23. A computer readable medium adapted so that a program for allowing a computer to execute similarity calculation processing which determines similarity between two vectors is recorded, the program including:

performing a distance calculation between the two input vectors in a component-wise hierarchical manner, comparing an integrated value of distances calculated incrementally for hierarchically higher-order components of the two vectors with a predetermined threshold value set, controlling the distance calculation in accordance with a result at the threshold value comparison, and outputting, as the similarity, integrated value of distances calculated up to the last components of the two vectors, wherein, in the case where the integrated value of distances calculated up to a certain component order is above the threshold value, control is conducted in such a manner to truncate the distance calculation.

24. The recording medium as set forth in claim 23, wherein, the distance calculation between respective components constituting the two input vectors is performed in a component-wise hierarchical manner and in the case where the integrated value of distances calculated up to a certain component order is below the threshold value, the distance calculation between next higher-order components is performed.

25. The recording medium as set forth in claim 24, further including:

implementing a predetermined transform operation to the two input vectors, and wherein, the distance calculation between the two transformed input vectors is performed in a predetermined order based on the predetermined transform operation.

26. The recording medium as set forth in claim 25, further comprising:

dividing component-wise the two transformed input vectors into a plurality of component-wise hierarchical partial vectors wherein, the distance calculation between respective components constituting partial vectors is performed in a component-wise hierarchical manner in order from the partial vector of the uppermost component order, and in the case where the integrated value of calculated distances between all components constituting partial vectors through to a certain component order is below the threshold value, the distance calculation between respective components constituting partial vector of the next lower component order is performed.

* * * * *